(12) United States Patent
Adler et al.

(10) Patent No.: US 10,417,683 B2
(45) Date of Patent: Sep. 17, 2019

(54) METHOD AND SYSTEM FOR MANUFACTURING A CUSTOM DESIGNED CONTAINER PACKAGE AND INSERTS

(71) Applicant: CASES BY SOURCE INC., Mahwah, NJ (US)

(72) Inventors: Matthew Adler, Mahwah, NJ (US); Jeffrey Chookazian, Mahwah, NJ (US)

(73) Assignee: Cases By Source Inc., Mahwah, NJ (US)

( * ) Notice: Subject to any disclaimer, the term of this patent is extended or adjusted under 35 U.S.C. 154(b) by 462 days.

(21) Appl. No.: 15/092,068

(22) Filed: Apr. 6, 2016

(65) Prior Publication Data
US 2017/0293957 A1  Oct. 12, 2017

(51) Int. Cl.
| G06Q 30/00 | (2012.01) |
| G06Q 30/06 | (2012.01) |
| G06F 3/0481 | (2013.01) |
| G06F 3/0484 | (2013.01) |

(52) U.S. Cl.
CPC ..... G06Q 30/0621 (2013.01); G06F 3/04817 (2013.01); G06F 3/04847 (2013.01); G06Q 30/0633 (2013.01); G06Q 30/0643 (2013.01); G06F 3/04842 (2013.01)

(58) Field of Classification Search
CPC ............ G06Q 30/0621; G06Q 30/0643; G06F 3/04842

USPC .............................................. 705/26.5, 27.2
See application file for complete search history.

(56) References Cited

U.S. PATENT DOCUMENTS

| 4,240,240 A | * | 12/1980 | Cohen | ..................... B65B 55/20 206/523 |
| 6,695,141 B2 | | 2/2004 | Kropf et al. | |
| 8,172,077 B1 | * | 5/2012 | Gray | ........................ B25H 1/04 190/107 |
| 2006/0127648 A1 | * | 6/2006 | De Luca | .................. A61B 8/12 428/174 |
| 2008/0157549 A1 | * | 7/2008 | St. Germain | ........... B66C 1/122 294/74 |
| 2010/0011889 A1 | * | 1/2010 | Lemmo | ................. B01L 3/0224 73/864.34 |

FOREIGN PATENT DOCUMENTS

GB  2011-K03434  *  8/2011  ........... G02B 6/4471

* cited by examiner

*Primary Examiner* — Yogesh C Garg
(74) *Attorney, Agent, or Firm* — John H. Choi & Associates

(57) ABSTRACT

A method and system for manufacturing a custom designed container or package and an insert received in the container or package by selecting a size of the container or package using a size graphical user interface of a graphical user interface displayed on a display device. The custom foam insert can be designed using an insert shape graphical user interface displayed on the display device. The custom foam insert includes one or more cavities corresponding to respective one or more features of one or more objects to be retained in the container or package.

19 Claims, 25 Drawing Sheets

**BRINGING YOUR NAPKIN SKETCH TO LIFE..
CUSTOM MOLDED CASES
DELIVERED**

LEVELS OF CUSTOMIZATION FOR ALL YOUR NEEDS

PRODUCTS
PROSUMER CASE;
FROM DJI PHATOM
MULTIPLE IPADS,
TOOLS, TO WINE
CASES FOR THE
CONNOISSEUR ( BROWSE PRODUCTS )

INSERTS
CUSTOMIZE STOCK
CASES WITH CUSTOM
FOAM INSERTS
EITHER THROUGH
OUR DIY CASEPRO
DESGINER, OR
DESIGN TEAM ( LEARN MORE )

INNOVATIONS
BRING YOUR NAPKIN
SKETCH TO LIFE...
SPECIALTY CASE
SOULTIONS DESIGND
TO ENCHANCE YOUR
BRAND.

( LEARN MORE )

YOUR DESIGN EXPERIENCE
▸ DISCOVERY
▸ CONCEPT
▸ DESIGN
▸ PRESEN
▸ TOOLING
▸ ─────
▸ ─────

HOW YOU BENEFIT
▸ BRANDED SOLUTION
▸ UNIQUE DESIGN
▸ DESIGN FOR MANUFACTURING
▸ ONE COMMON VISION

DESIGN YOUR OWN FOAM INSERTS
YOU CAN MAKE YOU OWN CUSTOM FOAM
INSERT USING THE ONLINE CASEPRO DESIGNER

STEP ① YOUR PART   STEP ② YOU DESIGN IT   STEP ③ WE MAKE IT ( START DESIGNING NOW )

THE CUSTOM CASE EXPERTS
MANUFACTURER AND DISTRBUTOR OF
CARRYING AND SHIPPING CASES WITH
CUSTOM FOAM INSERT - PELICAN CASES,
SKB CASES, GATOR CASES, AND MORE.

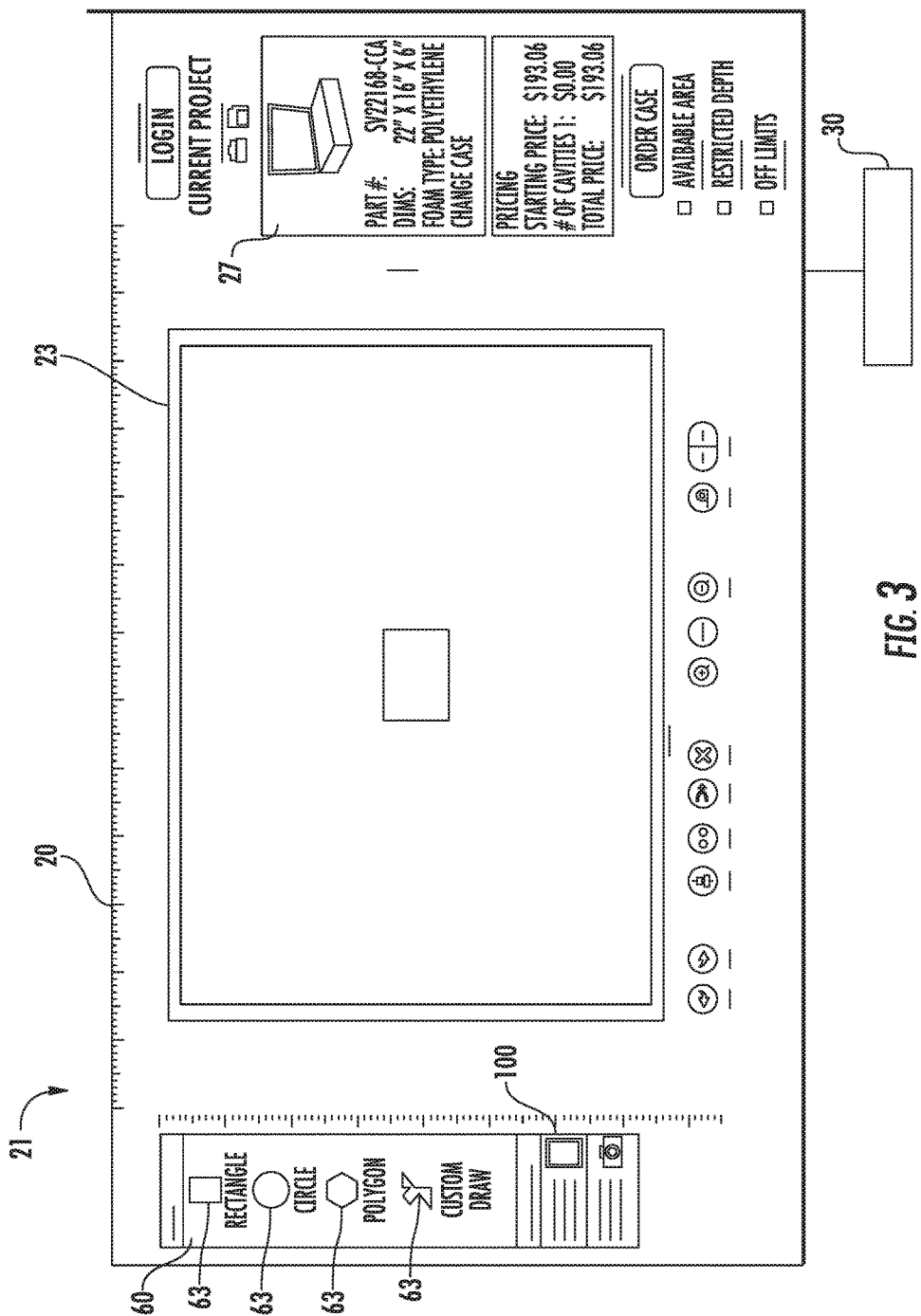

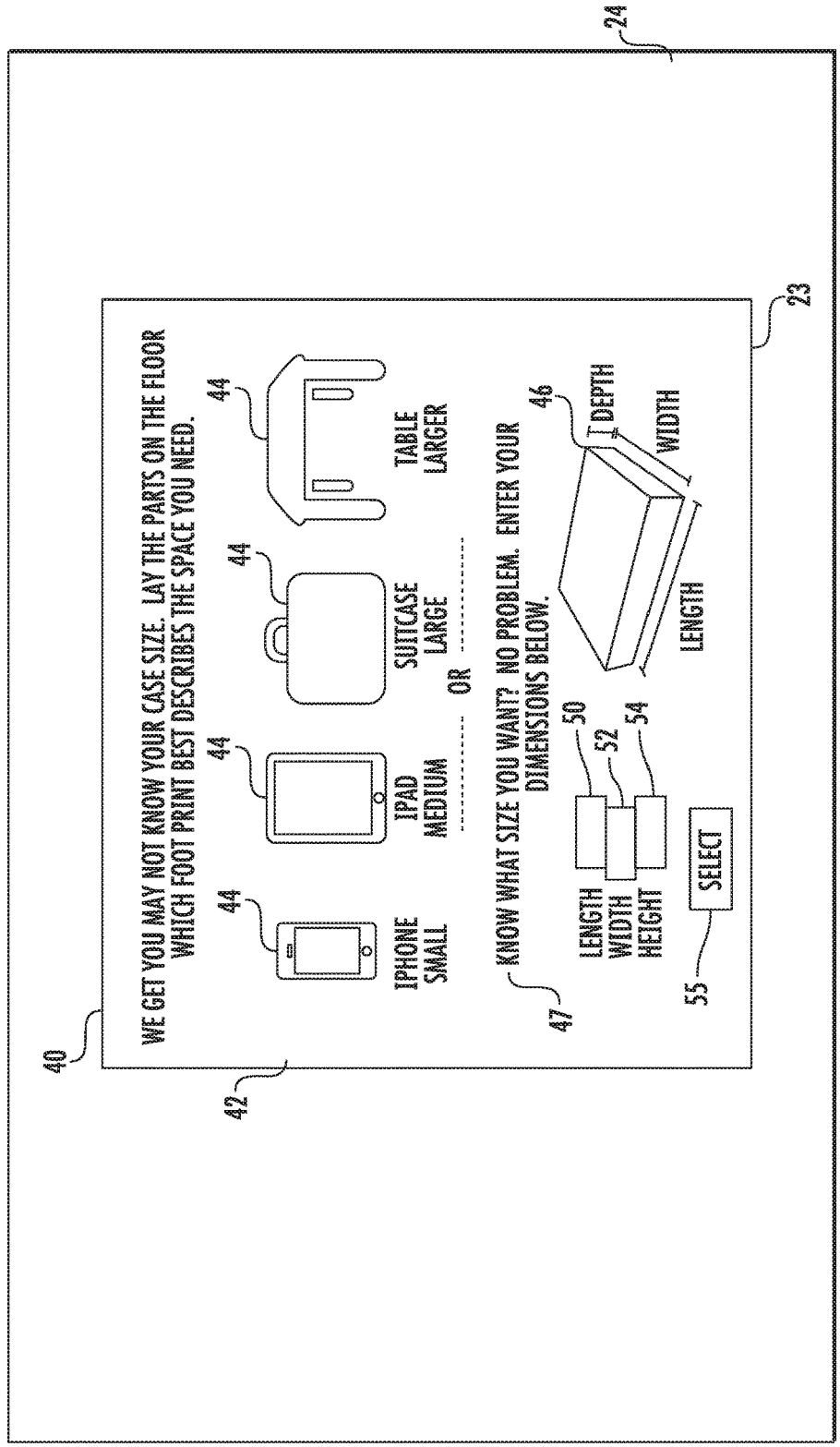

METHOD AND SYSTEM FOR MANUFACTURING A CUSTOM DESIGNED CONTAINER PACKAGE AND INSERTS

BACKGROUND OF THE INVENTION

Field of the Invention

The present invention relates to computer implemented methods and systems for creating a user-driven custom designed insert for a container or package and methods for selling the custom designed products online to the general public.

Description of Related Art

Open cell foam and closed cell foam have been used in shipping containers for protection of contents therein. An example open cell foam has been manufactured in predetermined shapes and sizes for cases and packaging by the FOAM FACTORY as Pick and Pluck charcoal foam. The foam can be separated by hand to fit around an object.

U.S. Pat. No. 6,695,141 describes a container package for holding an entire computer system including a monitor, a computer case and a printer. A first foam insert has a flat bottom surface and a formed upper surface matched to the shape of a portion of the monitor and a portion of the computer case. A second foam insert has a formed lower surface matched to the shape of another portion of the monitor and another portion of the computer case and a formed upper surface matched to a portion of the printer. A third foam insert has a formed lower surface matched to another portion of the printer and a flat upper surface. A container includes a lower portion and an upper portion. The first foam portion is positionable in a lower portion of the container and an upper portion is positionable over the first foam insert, the second foam insert, the third foam insert and the monitor, the computer case, and the printer.

It is desirable to provide a method and system for creating user-driven custom designed containers or packages and inserts for packaging user selected objects.

SUMMARY OF THE INVENTION

The present relates to a method for manufacturing a custom designed container or package and an insert received in the container or package by selecting a size of the container or package using a size graphical user interface of a graphical user interface displayed on a display device. The custom foam insert can be designed using an insert shape graphical user interface displayed on the display device. The custom foam insert includes one or more cavities corresponding to respective one or more features of one or more objects to be retained in the container or package.

In one embodiment, the size of a container or package can be selected by providing a template at the size graphical user interface to instruct a user to place objects to be packaged on a flat surface in a layout. One or more graphical common objects are displayed on the display device. One of the graphical common objects can be selected to best match the layout for determining the size of the container or package.

In one embodiment, the design of the custom foam insert can be performed by causing one or more shapes to be displayed on the display device by the graphical user interface, selecting one or more of the displayed shapes and spacing the one or more selected shapes on the display device. In one aspect, a user places a first one of the selected shapes at a position of a right most point of a starting canvas and the user places a second one of the selected shapes a position of a left most point of the starting canvas. The remaining one or more of the selected shapes are automatically spaced evenly between the first one of the selected shapes and the second one of the selected shapes on the display device.

Alternatively, the custom foam insert can be designed by uploading a photograph of the one or more objects using the insert shape graphical user interface displayed on the display device, creating a trace representation of the uploaded photograph on the display device, and saving the trace representation to a memory as a data file in a user's library. A user can also adjust detail of the trace on the display device. By using a design tool, a user can add or remove points or paths from the trace. Once a user confirms traced points, the design tool can crop the canvas to the outermost points of the shape. The user can be prompted to input an object depth and length. The depth is the distance the cavity goes into the foam. The length is the object's left most point to the right most point. These measurements can be used to scale the traced shape.

The shapes stored in the user's library are only accessible to the specific user when logged in. By saving shapes to the user's library the user can access the shapes at a later date. If the user frequently uses a particular shape in a different container or package the user does not need to upload the photograph every time. The library allows the user to upload the photograph once and then use the determined shape multiple times.

The type of the foam used in the insert can be changed at any time during the design process. When the new foam type is selected a price of the insert dynamically changes.

In one embodiment, the present invention provides causing a metric to imperial toggle icon to be displayed on the display device. The metric to imperial toggle icon can be activated to switch between metric and imperial measurement standards in real time used in determining the size of the container or package.

In one embodiment, the present invention provides causing a zoom icon to be displayed on the graphical user interface on the display device. The zoom icon is activated to size the starting canvas to a pre-determined value. For example, the user's screen can be locked in a 1:1 ratio. In one embodiment, validation rules are integrated into the steps for creating the custom insert.

In one embodiment the present invention is directed to web-based software for creating custom designed foam inserts for containers or packages to enables users to select a specific case, design a custom foam insert, and then submit an online order using a shopping cart. Alternatively, a user can launch a pre-designed case and insert, modify the design of the insert and then checkout. In one embodiment, the user can forward the design in a shopping cart to someone else to make a purchase. Any or all of the items listed above may be implemented by a custom designed container or package and insert system that includes a data storage facility, a processor, and computer-readable medium containing programming instructions that, when executed, instruct the processor to perform various functions. While generally described as computer implemented software embodied on non-transitory media that processes and transforms the respective data, some or all of the aspects may be computer implemented methods or further included in respective systems or other devices for performing this described functionality.

The invention will be more fully described by reference to the following drawings.

BRIEF DESCRIPTION OF THE DRAWINGS

FIG. 2 is a schematic diagram of a user interface used to trigger a graphical user interface in the method for manufacturing a custom designed container or package and insert.

FIG. 3 is a schematic diagram of a graphical user interface used in the method for manufacturing a custom designed container or package and insert.

FIG. 4 is a schematic diagram of a display size graphical user interface used in the method for manufacturing a custom designed container or package and insert.

FIG. 17 is a schematic diagram of an add custom foam icon which can be activated to modify the design of custom foam insert used in the method for manufacturing a custom designed container or package and insert.

Figure 20:
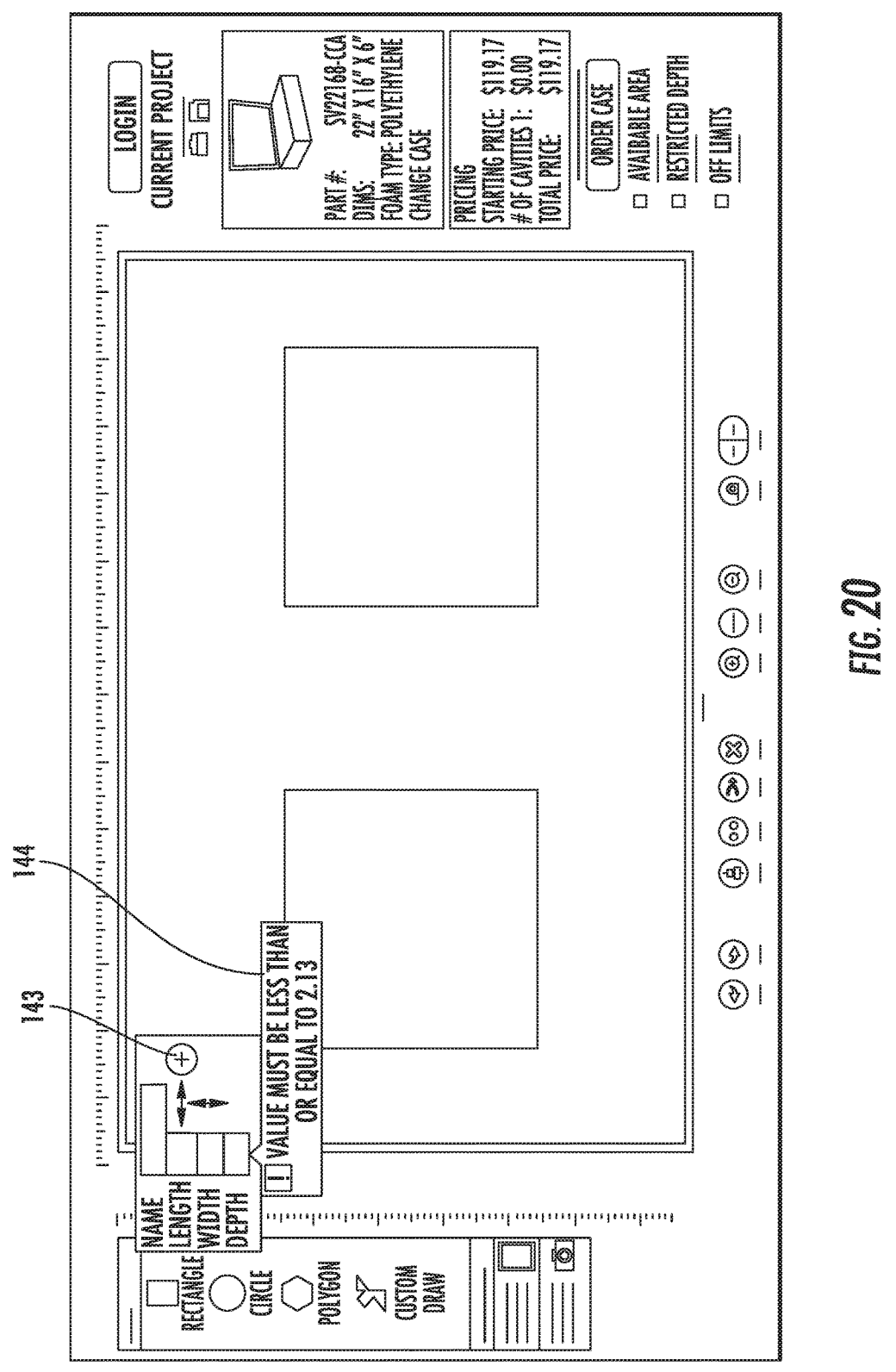

FIG. 20 is a schematic diagram of an add cavity icon used in the method for manufacturing a custom designed container or package and insert.

DETAILED DESCRIPTION

Figure 1:
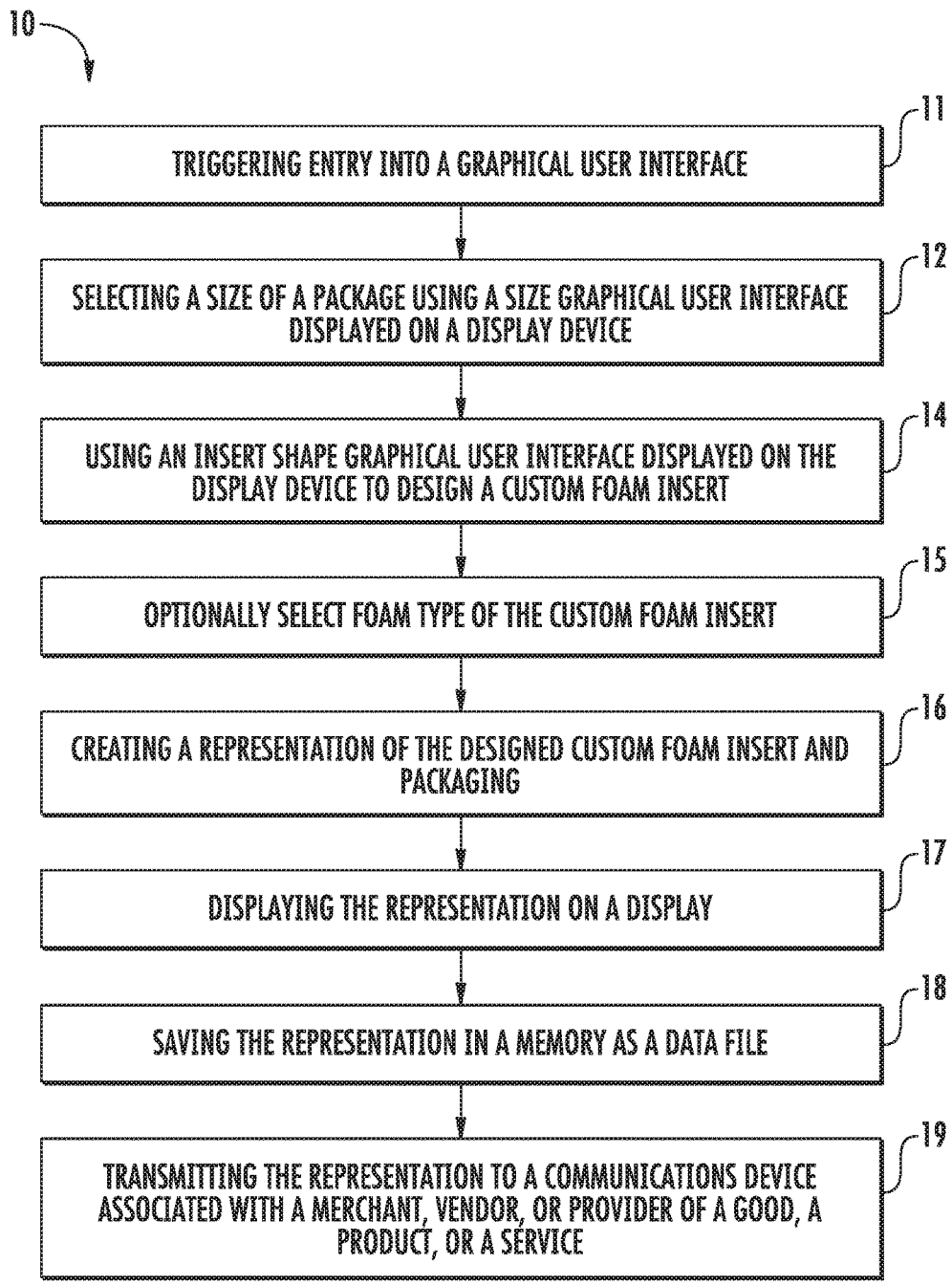
FIG. 1 is a flow diagram for a method for manufacturing a custom designed container or package and an insert.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 is a flow diagram of a method for manufacturing a custom designed container or package and an insert 10 including steps that a system for manufacturing a custom designed container or package and insert can follow in accordance with the teachings of the present invention. In block 11, a design icon is selected to trigger entry into a design tool graphical user interface. In one embodiment, design icon 19 is selected at user interface 21 on display 24 as shown in FIG. 2. In block 12, a size of a package is selected at a user interface. In one embodiment, design tool graphical user interface 20 is displayed at user interface 21 after being triggered by design icon 19 and is used at user interface 21 as shown in FIG. 3. User interface 21 provides output to and receives input from a user. The user interface can include a display, audio output, a printer or another element that provides information to a user. User interface 21 can also include a touch sensitive component, microphone, audio port, keyboard, mouse, touchpad or other input mechanism that is capable of receiving user input. Design tool graphical user interface 20 can display starting canvas 23 which can be used for selecting a size of a container or package on display 24. Design tool graphical user interface 20 can be implemented using design tool 30. In one embodiment, design tool 30 can be developed using SVG-edit. SVG-edit is a web-based, JavaScript-driven SVG drawing editor that works in conventional browsers.

Design icon 19 can be activated to display size graphical user interface 40 on display 24 as shown in FIG. 4. Template 42 of size graphical user interface 40 can be used to instruct a user to place objects to be packaged on a flat surface, for example the floor. The user is directed to layout the objects according to how the objects would be located in a package. Size graphical user interface 40 displays graphical common objects 44. Graphical common objects 44 represent size options for the container or package. Example containers or packages include cases, housings, cartons, boxes and the like. One or more of graphical objects 44 can be selected by the user to best match the layout of the objects that the user desires be retained in the container or package. From the selected graphical common object 44 a size of starting canvas 23 can be determined.

Figure 5A:
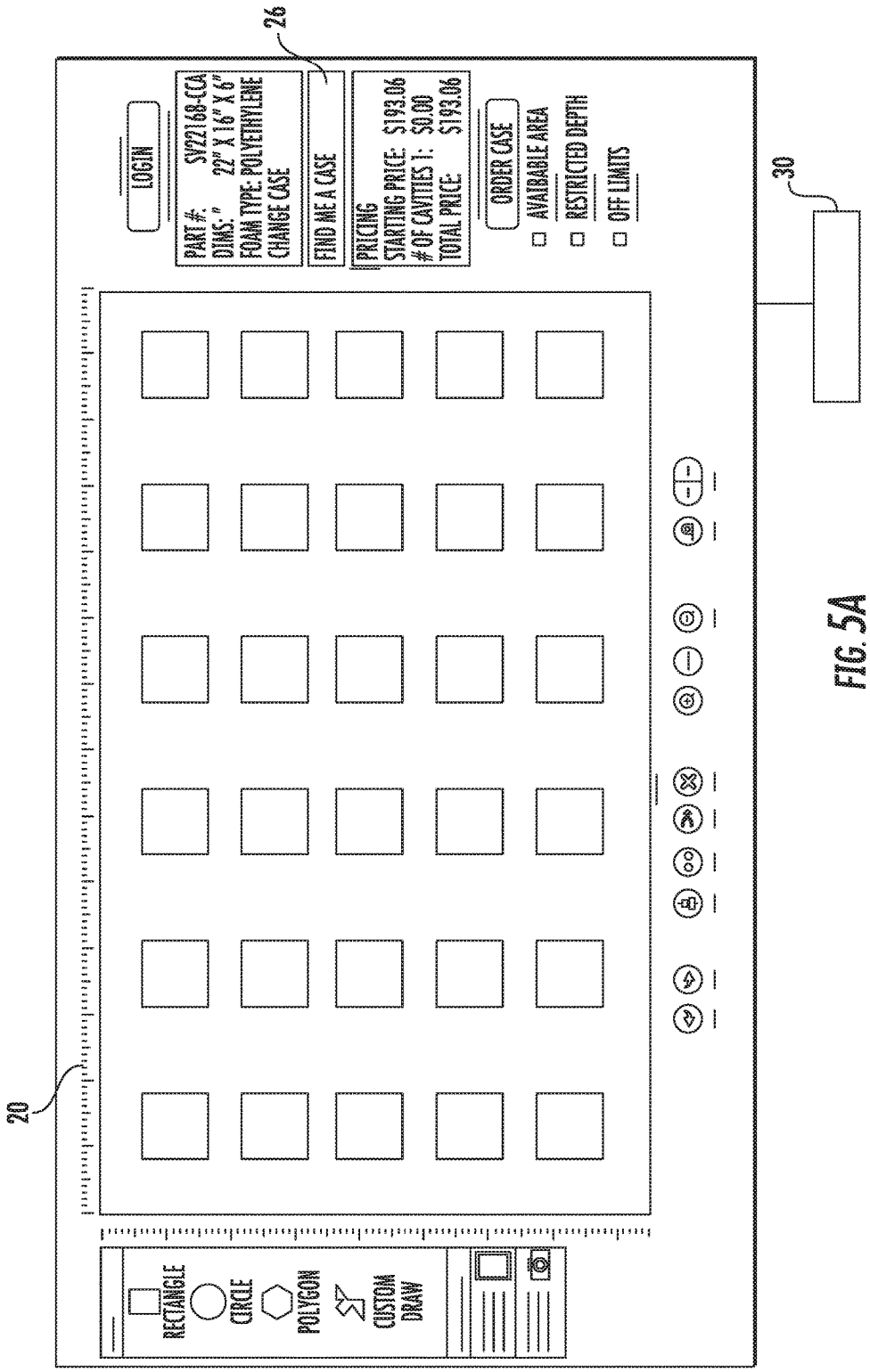
FIG. 5A is a schematic diagram of a find me a case button on a design tool graphical user interface.
Figure 5B:
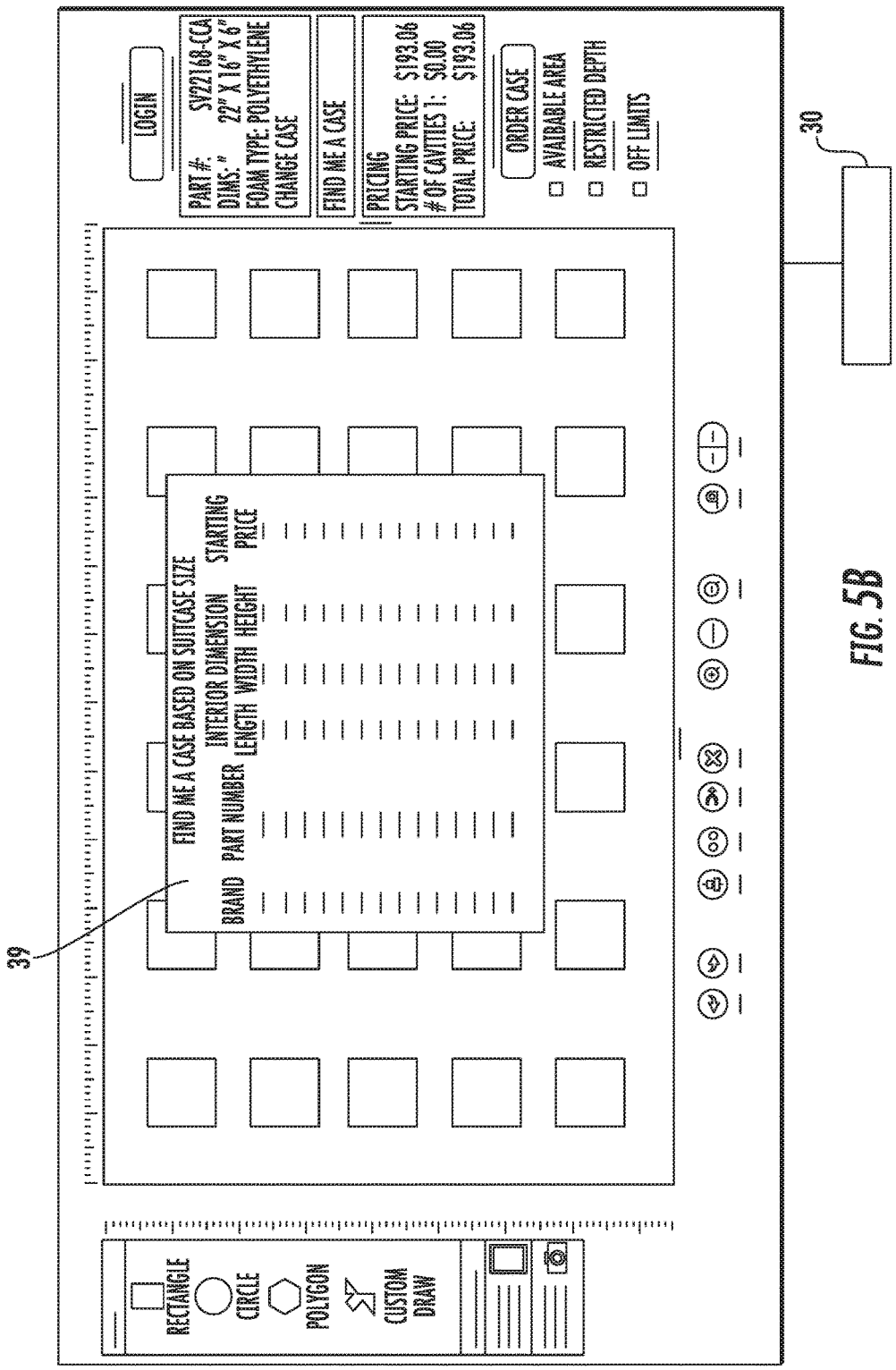
FIG. 5B is a schematic diagram of a user interface for finding a case.

Alternatively, find me a container icon 26 as shown in FIG. 5A can be selected at design tool graphical user interface 20. Find me a container icon 26 can be activated to display new design user inter face 39 as shown in FIG. 5B to display one or more containers or packages 46 having a predetermined size in relation to graphical common objects 44 as shown in FIG. 4. For example, one or more containers or packages 46 can be displayed having a predetermined size of up to four inches larger in each dimensions to graphical common objects 44. A container or package 46 can be selected by the user with graphical user interface 40. Graphical representation of a selected container or package and insert 27 can be displayed at display 24 as shown in FIG. 3.

Referring to FIG. 4, size graphical user interface 40 can display template 47 to instruct a user to enter known dimensions. A length dimension can be entered in interface box 50. A width dimension can be entered in interface box 52. A height dimension can be entered in interface box 54. After entering the dimensions, a user can select the entered dimension using user select box 55. From the selected dimensions, a size of starting canvas 23 can be determined. Perimeter 28 can be added to starting canvas 23 as shown in FIG. 3.

Figure 6:
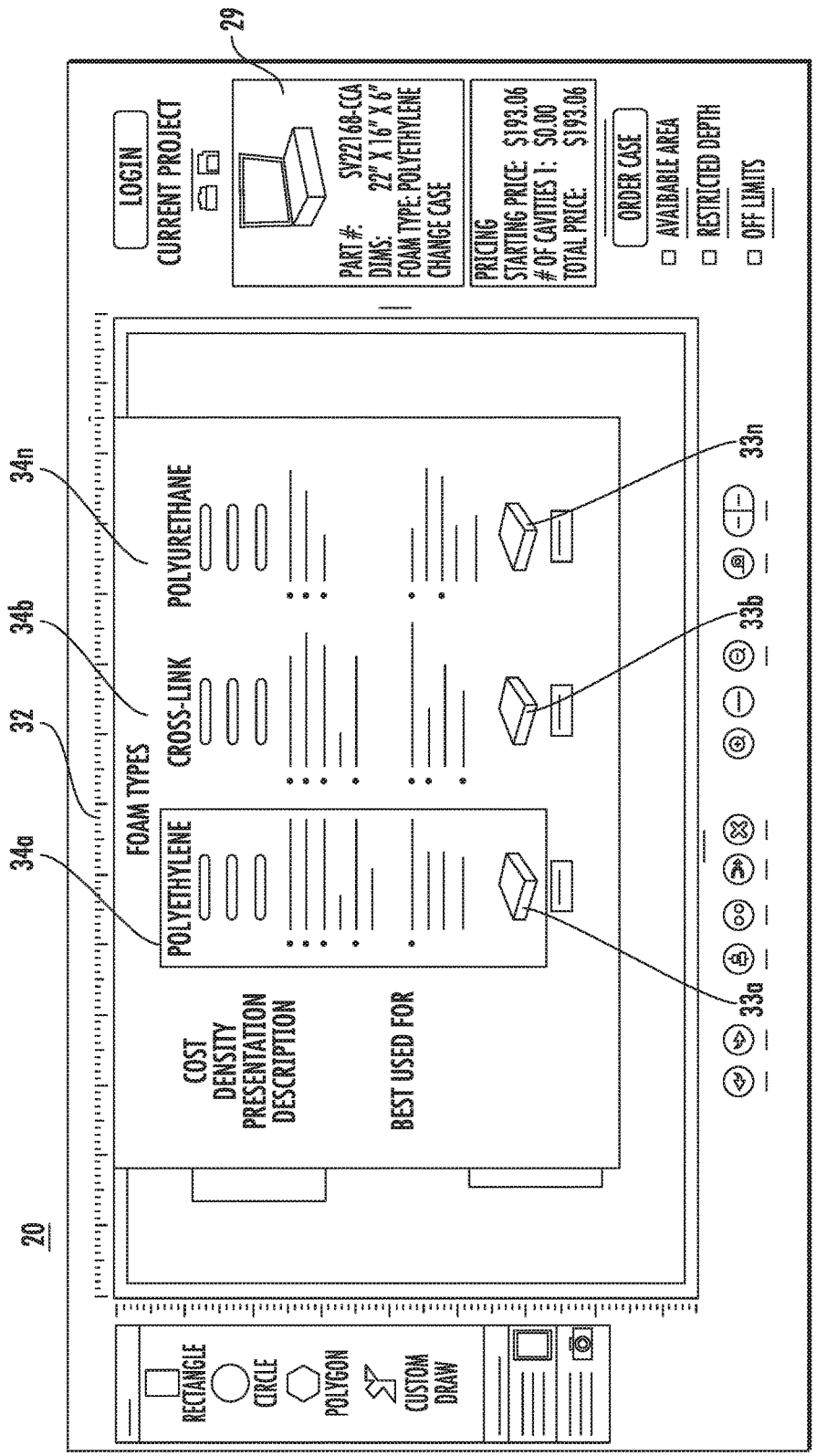
FIG. 6 is a schematic diagram of foam type user interface and templates used in the method for manufacturing a custom designed container or package and insert.

Referring to FIG. 1, in block 14 a design of a custom foam insert to be used in the container or package can be determined. In block 15, a foam type can be optionally selected. Design tool 30 designates a default foam type. For example, the default foam type can be polyethylene. Foam type icon 29 can be displayed on design tool graphical user interface 20 as shown in FIG. 6. Optionally, foam type icon 29 can be activated to select a foam type at any time. Activating of foam type icon 29 can launch pop-up foam type window 32 displaying a plurality of foam types 33a-33n which can be selected by a user. Corresponding comparison chart templates 34a-34n can be displayed which describe features of the foam types.

Figure 7:
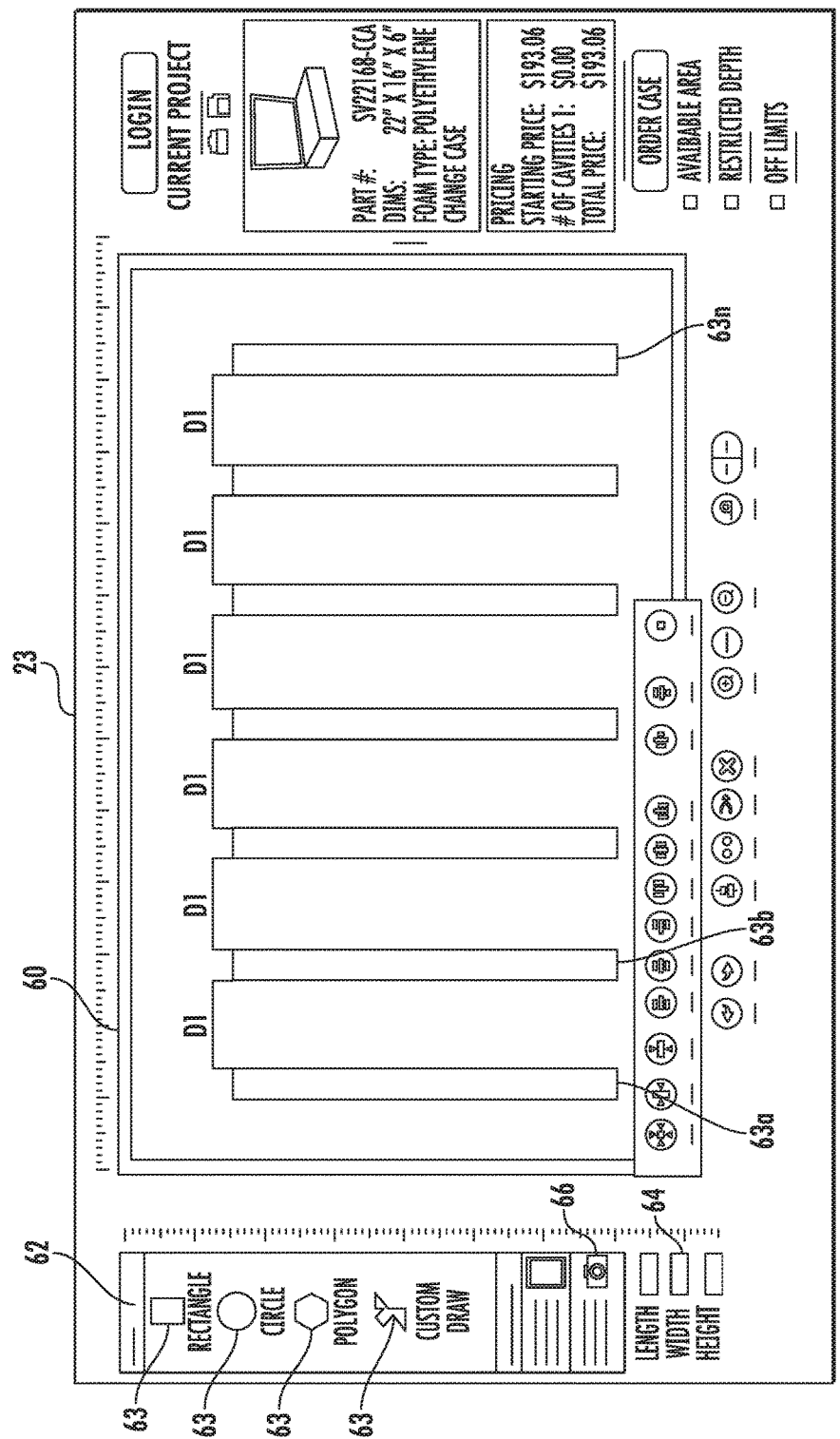
FIG. 7 is a schematic diagram of an insert shape graphical user interface used in the method for manufacturing a custom designed container or package and insert.

In one embodiment to implement block 14, insert shape graphical user interface 60 can be displayed on display device 24 as shown in FIG. 7. Shape selection toolbox 62 can display one or more shapes 63. After one or more shapes 63 are selected, shapes 63a-63n can be evenly spaced from left most shape 63a to right most shape 63n. A user places each of the shapes 63a-63n on starting canvas 23 then positions one shape 63a to the left most point they want then moves another shape 63n to the right most point they want. Once establishing the distance between first and last shape, the user can select space evenly icon 64 which automatically places the same distance D1 on starting canvas 23 between each shape 63a-63n.

Figure 8:
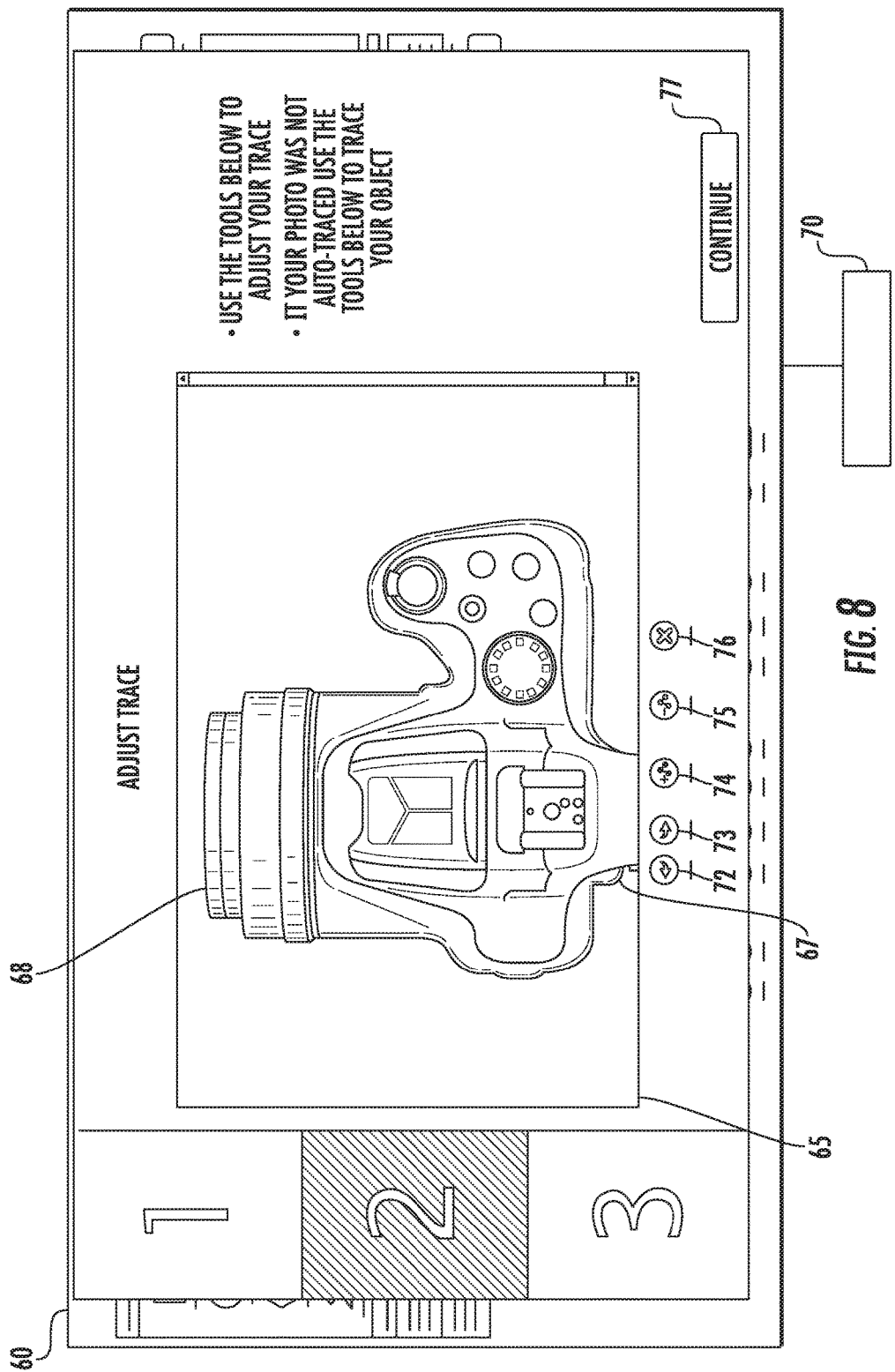
FIG. 8 is a schematic diagram of a photo trace window used in the method for manufacturing a custom designed container or package and insert.

In one embodiment, photo trace icon 66 displayed on insert shape graphical user interface 60 can be used to design the custom foam to be used in the container or package. After photo trace icon 66 is activated, a user can take a photo of object 67 and then upload it in photo trace window 65 as shown in FIG. 8.

Photo trace design tool 70 can be used to determine that photo of object 67 meets specific guidelines, for example photo of object 67 includes a contrast background color and photo of object 67 has a predetermined format, such as for example jpg, jpeg, png, and gif.

Figure 9:
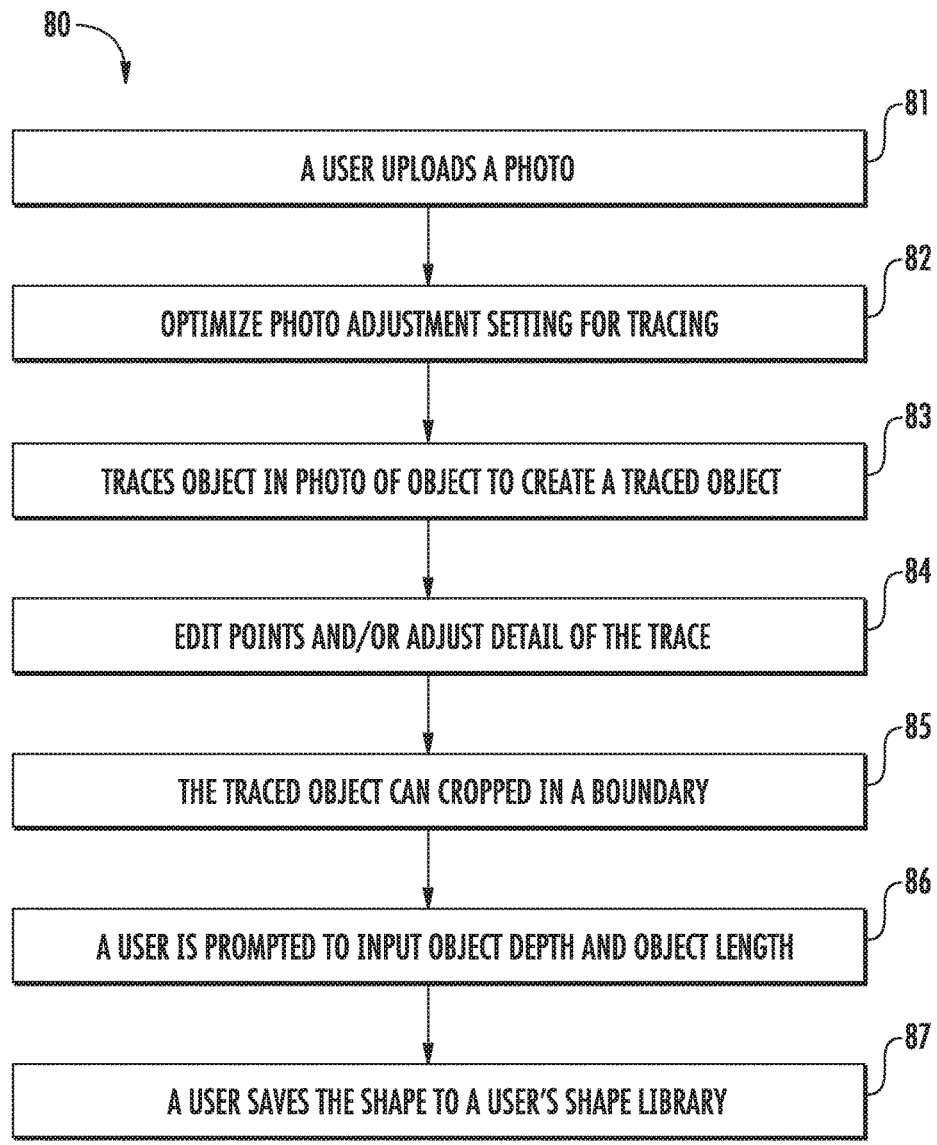
FIG. 9 is a flow diagram of steps that can be used by a photo trace design tool to auto trace an object in the photograph and save the trace to a user's library.

FIG. 9. is a flow diagram 80 of steps that can be used by photo trace design tool 70 to auto trace the part in photo of object 67 and save the trace to a user's private library. Photo trace design tool 70 can converts a bitmap to vector graphics. In one embodiment, phot trace design tool 70 is developed using SVG-edit. SVG-edit is a web-based, JavaScript-driven SVG drawing editor that works in most browsers.

Figure 10:
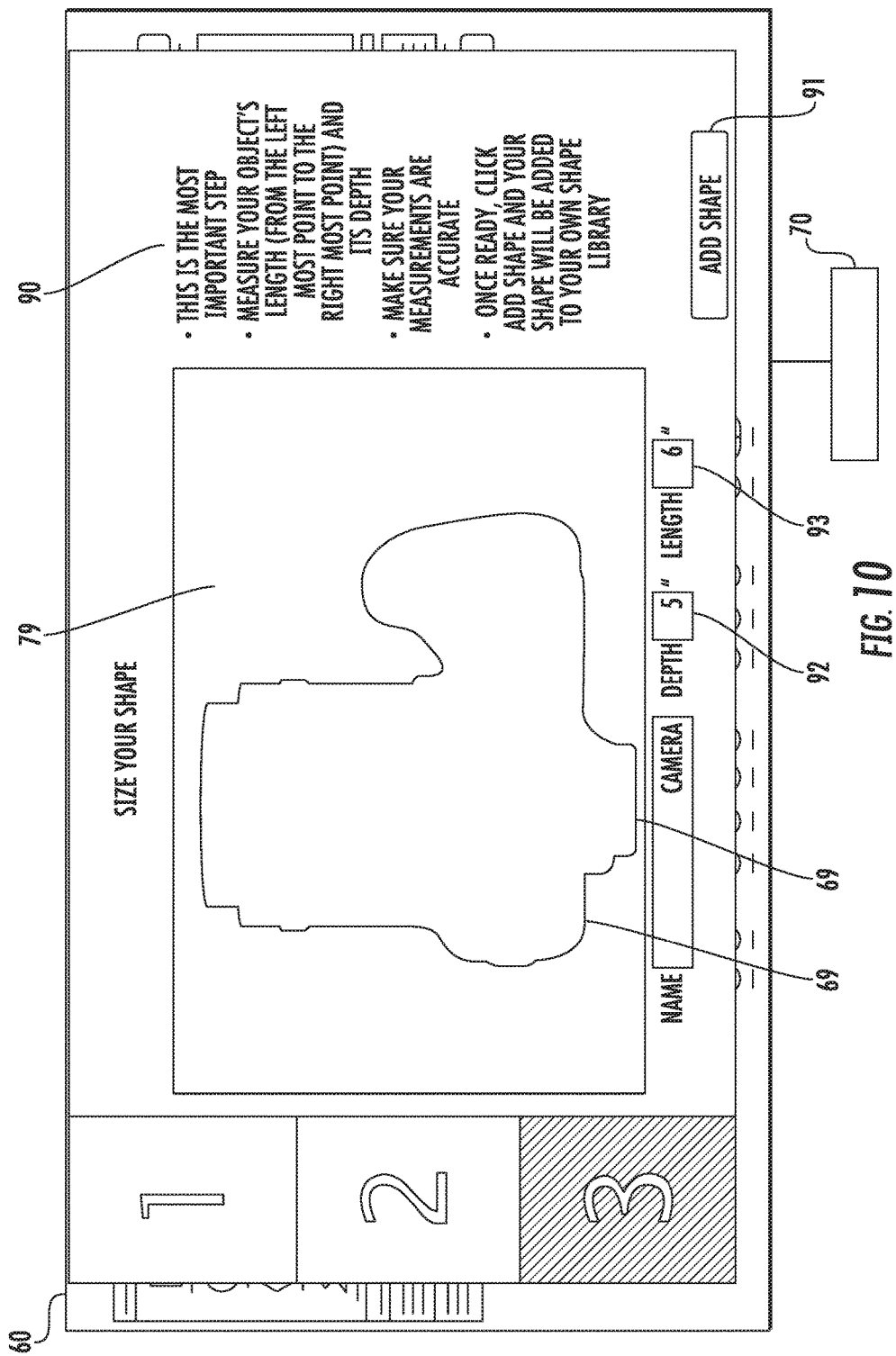
FIG. 10 is a schematic diagram of traced object used in the method for manufacturing a custom designed container or package and insert.

In block 81, a user uploads a photo. In block 82, photo trace design tool 70 runs a command to optimize photo adjustment settings for tracing. In block 83, photo trace design tool 70 traces object 68 in photo of object 67 as shown in FIG. 8 to create traced object 69 as shown in FIG. 10. Referring to FIG. 9, in block 84, a user can edit points and/or adjust detail of the trace add or remove points from the trace by activating respectively one or more of undo icon 72, redo icon 73, add point 74, delete point 75 and clear path

76 as shown in FIG. 8. After the trace is complete, the user can activate continue icon 77 to generate traced object 69 as shown in FIG. 10.

Referring to FIG. 9, in block 85 the traced object can be cropped in a boundary which is used for size ratio formatting. In one embodiment, traced object 69 can be cropped by rectangle boundary 79 as shown in FIG. 10 allowing object 69 to be imported in graphical user interface 20 in the objects actual size and proportion.

Referring to FIG. 9, in block 86 a user is prompted to input object depth and object length. Template 90 generated by photo trace design tool 70 can provide a prompt to input object depth and object length as shown in FIG. 10. Depth can be entered in template box 92 and length can be entered in template box 93. The depth is the distance the cavity goes into the foam. The length is the object's left most point to the right most point. The depth and length measurements can be used to scale traced object 69.

Figure 11:
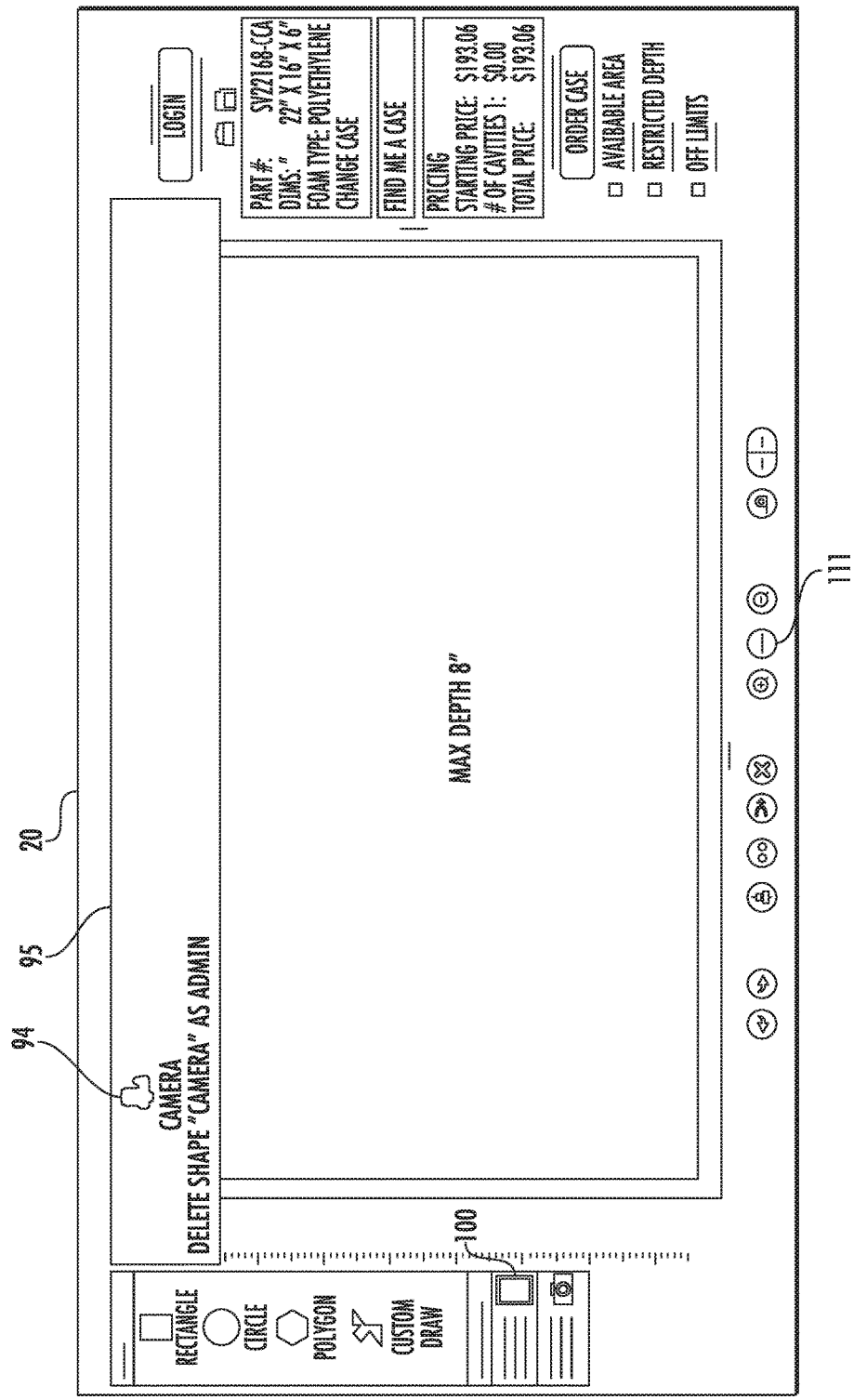
FIG. 11 is a schematic diagram of an add shape icon which is activated to save a traced object to a user's shape library used in the method for manufacturing a custom designed container or package and insert.

Referring to FIG. 9, in block 87 a user can save the shape to a user's shape library. In one embodiment, add shape icon 91 as shown in FIG. 10 is activated to save icon 94 showing traced object 69 to a user's shape library 95 as shown in FIG. 11. The shapes stored in user's shape library 95 are accessible to a specific user when logged into design tool 30. In addition, shapes can also be manually stored in user's shape library 95 by an administrator.

My shape library icon 100 can be displayed on graphical user interface 20 as shown in FIG. 11. A user can activate my shape library icon 100 to retrieve one or more of shapes which were previously stored user's shape library 95.

Figure 12:
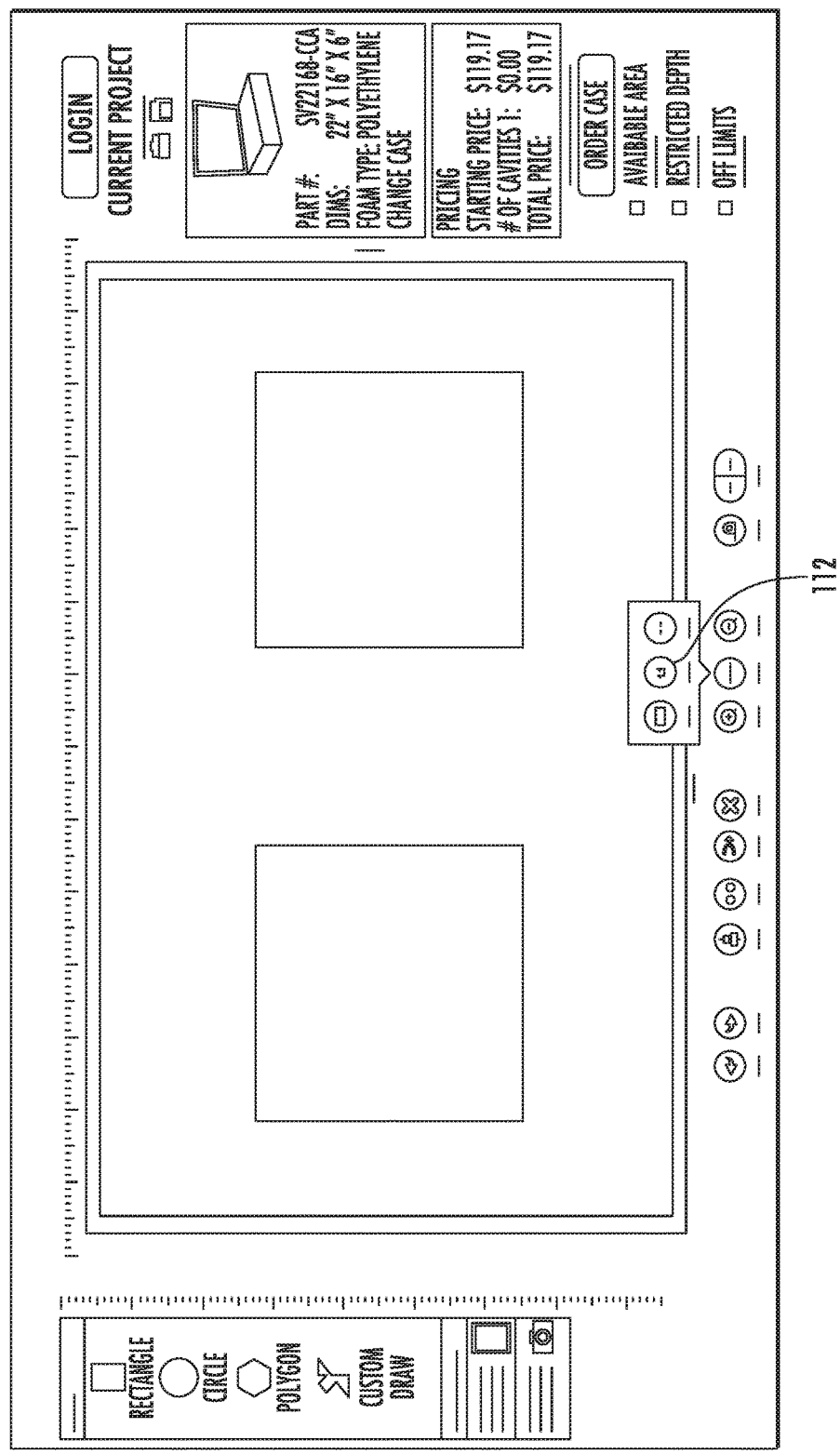
FIG. 12 is a schematic diagram of a zoom icon used in the method for manufacturing a custom designed container or package and insert.
Figure 13:
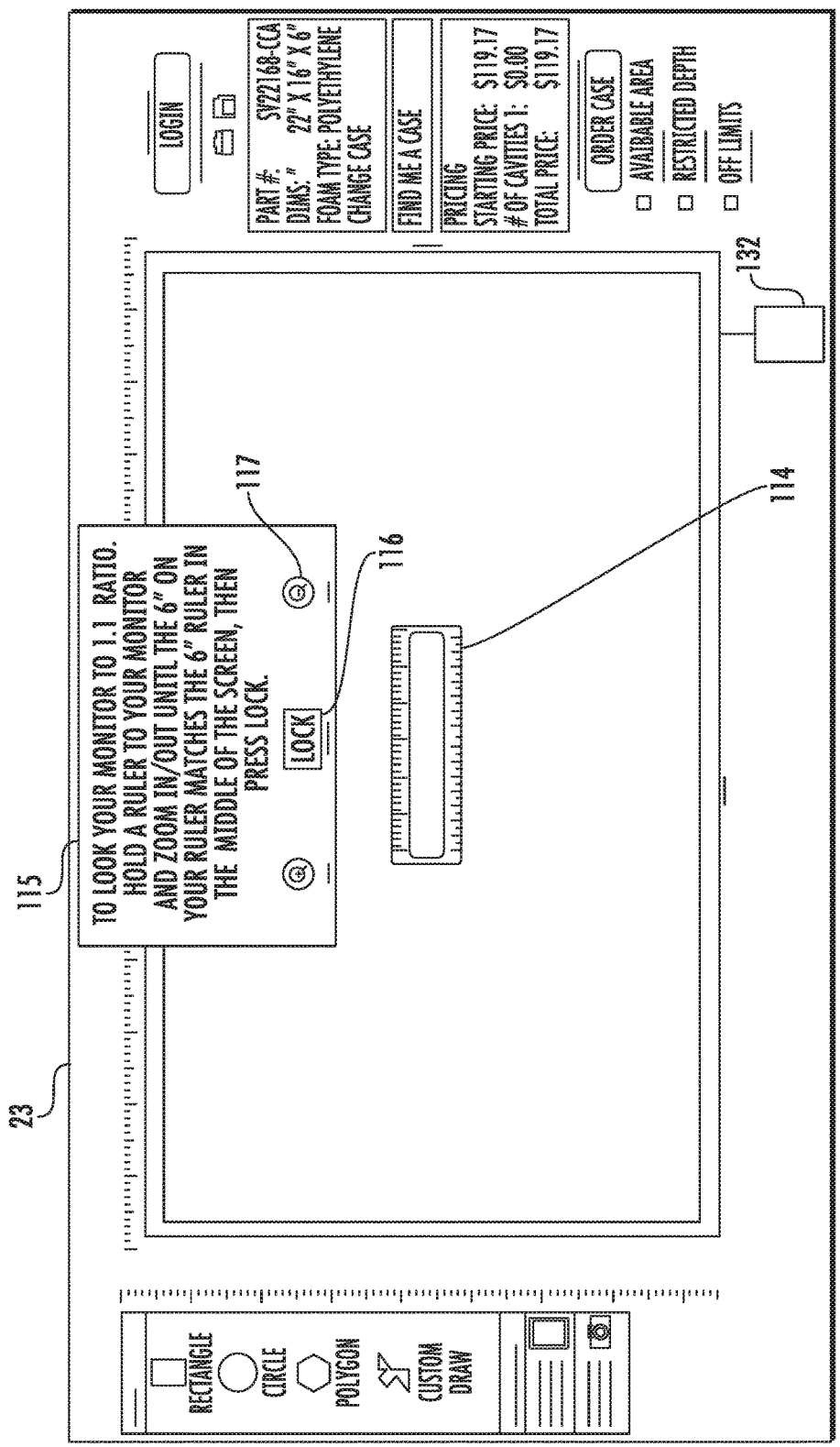
FIG. 13 is a schematic diagram of a zoom actual icon and zoom template used in the method for manufacturing a custom designed container or package and insert.
Figure 14:
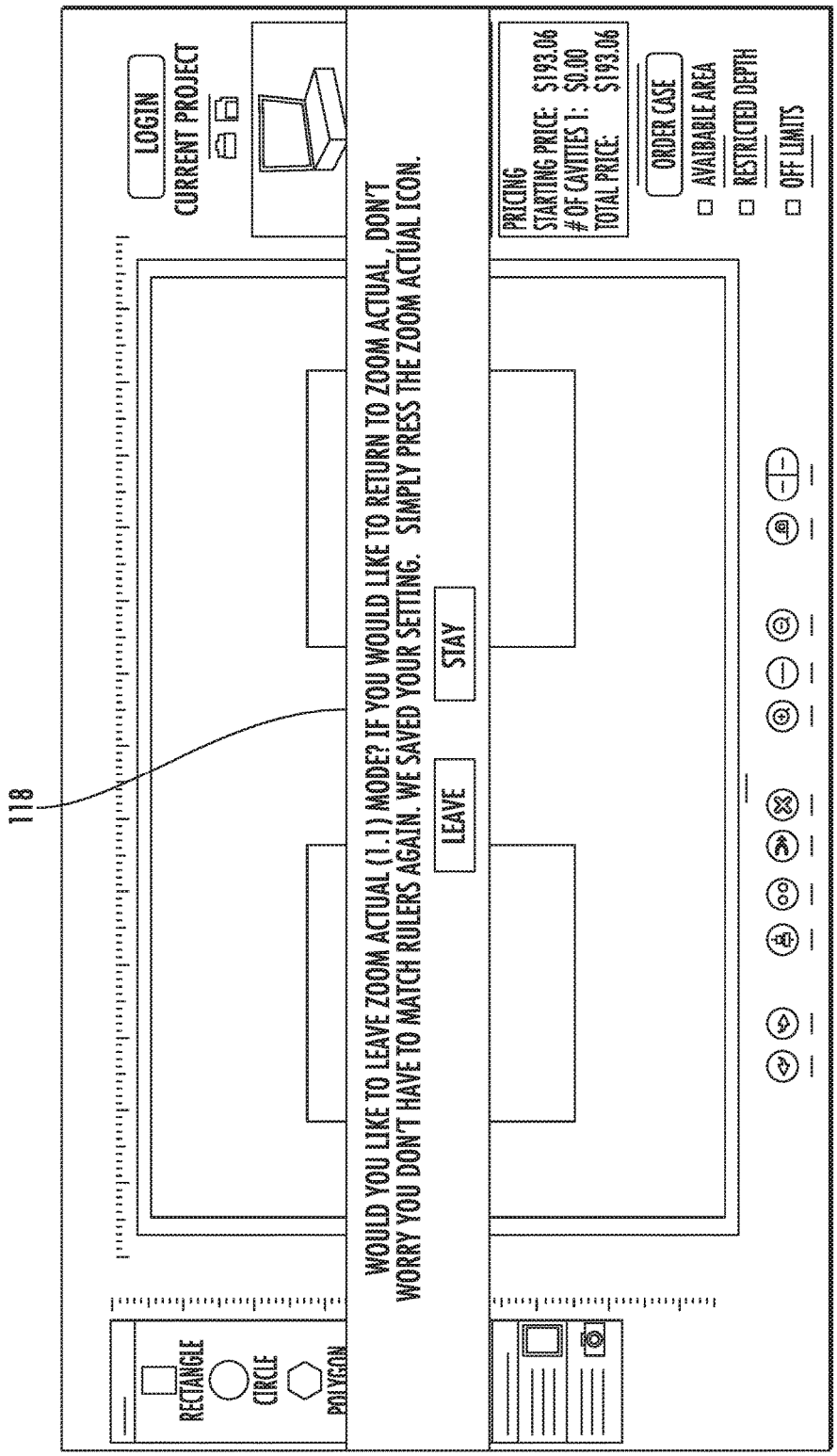
FIG. 14 is a schematic diagram of a user leave window template used in the method for manufacturing a custom designed container or package and insert.

A user can activate icon 110 as shown in FIG. 11 to activate zoom actual icon 112 as shown in FIG. 12 to lock starting canvas 23 of graphical user interface 60 to a pre-determined value. In one embodiment, zoom lock icon 116 is activated to lock starting canvas 23 into a 1:1 ratio, such that 1 inch on canvas 23 is 1 inch as shown in FIG. 13. Screen ruler icon 114 can be used with starting canvas 23. Zoom template 115 can indicate directions such as, "To lock your monitor to 1:1 ratio hold a ruler to your monitor and zoom in/out until the 6" on your ruler matches the 6" on the middle of the screen. Then press Lock." Zoom lock icon 116 can be used to lock starting canvas 23 after screen ruler icon 114 has been activated to determine the ratio of the canvas. In this embodiment, once locked after activating zoom lock icon 116, starting canvas 22 will be in the predetermined ratio, such as a 1:1 ratio, unless switch zoom options icon 117 is activated. If a user accidentally scrolls mouse 132, a user leave template window 118 as shown in FIG. 14 can be displayed indicating for example, "if you would like to leave Zoom Actual mode". If a user leaves the zoom actual mode, the user can return to setting any time during current session by activating zoom actual icon 112 as shown in FIG. 12 and the user does not need to recalibrate.

Figure 15:
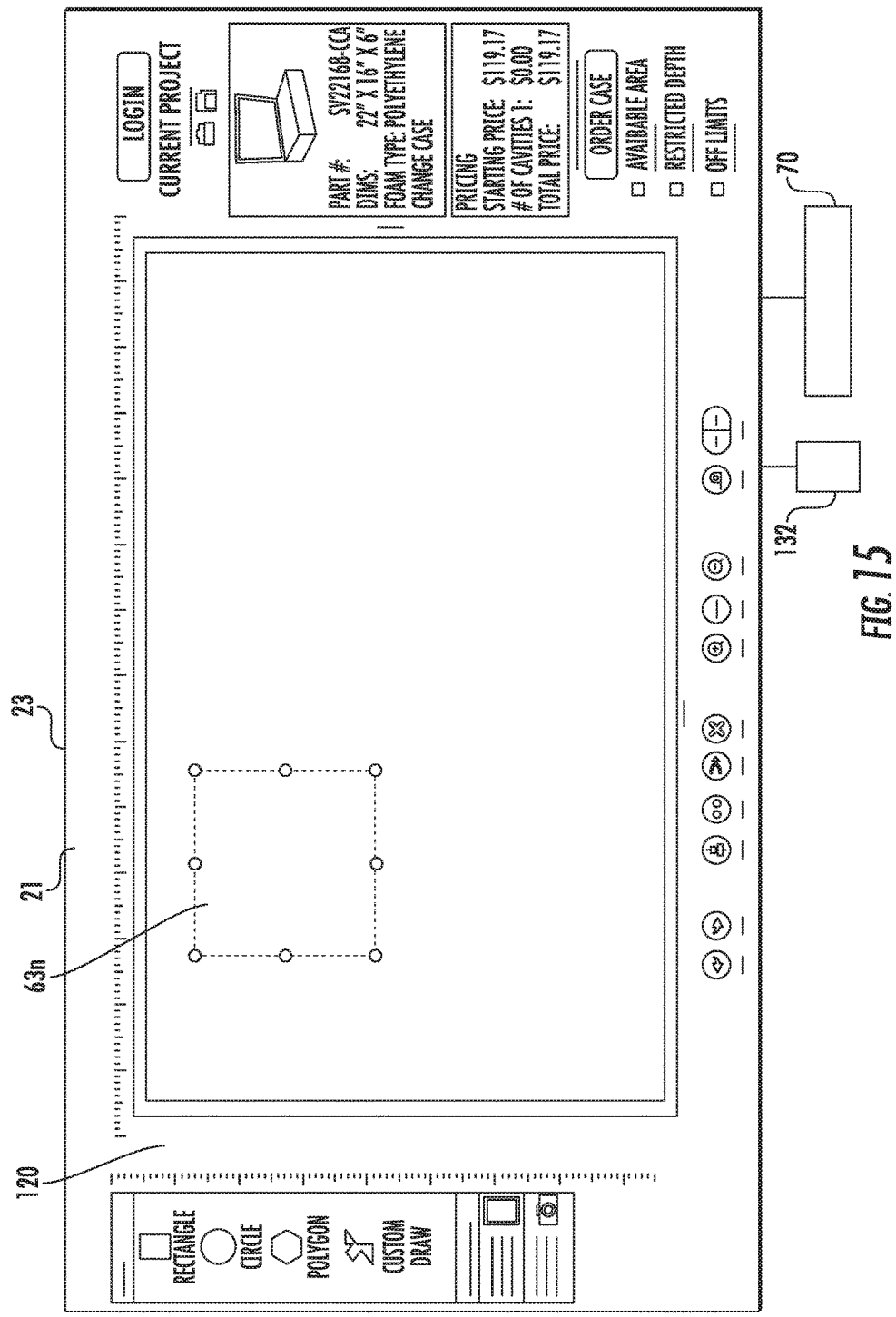
FIG. 15 is a schematic diagram of an off limits area and starting canvas used in the method for manufacturing a custom designed container or package and insert.

Referring to FIG. 15, photo trace design tool 70 can move a selected shape 63a-63n placed into off limits area 120 or border area 21 back onto starting canvas 23. For example, if a user moves a shape into off limits area 120 and then releases mouse 132 shape 63a-63n will automatically bounce back into canvas 23.

Figure 16:
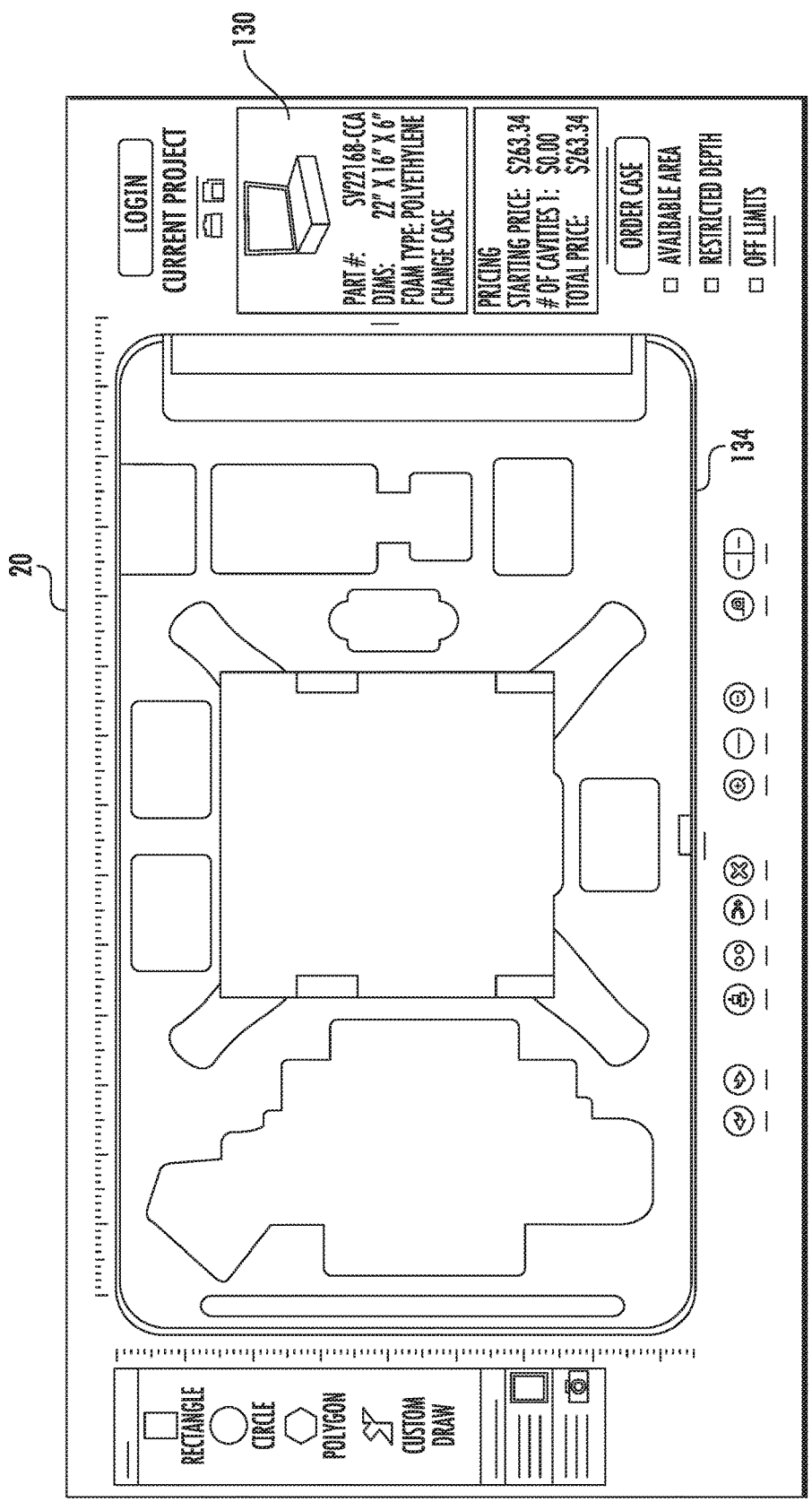
FIG. 16 is a schematic diagram of an a custom foam which can displayed showing design of a custom foam insert used in the method for manufacturing a custom designed container or package and insert.
Figure 17:
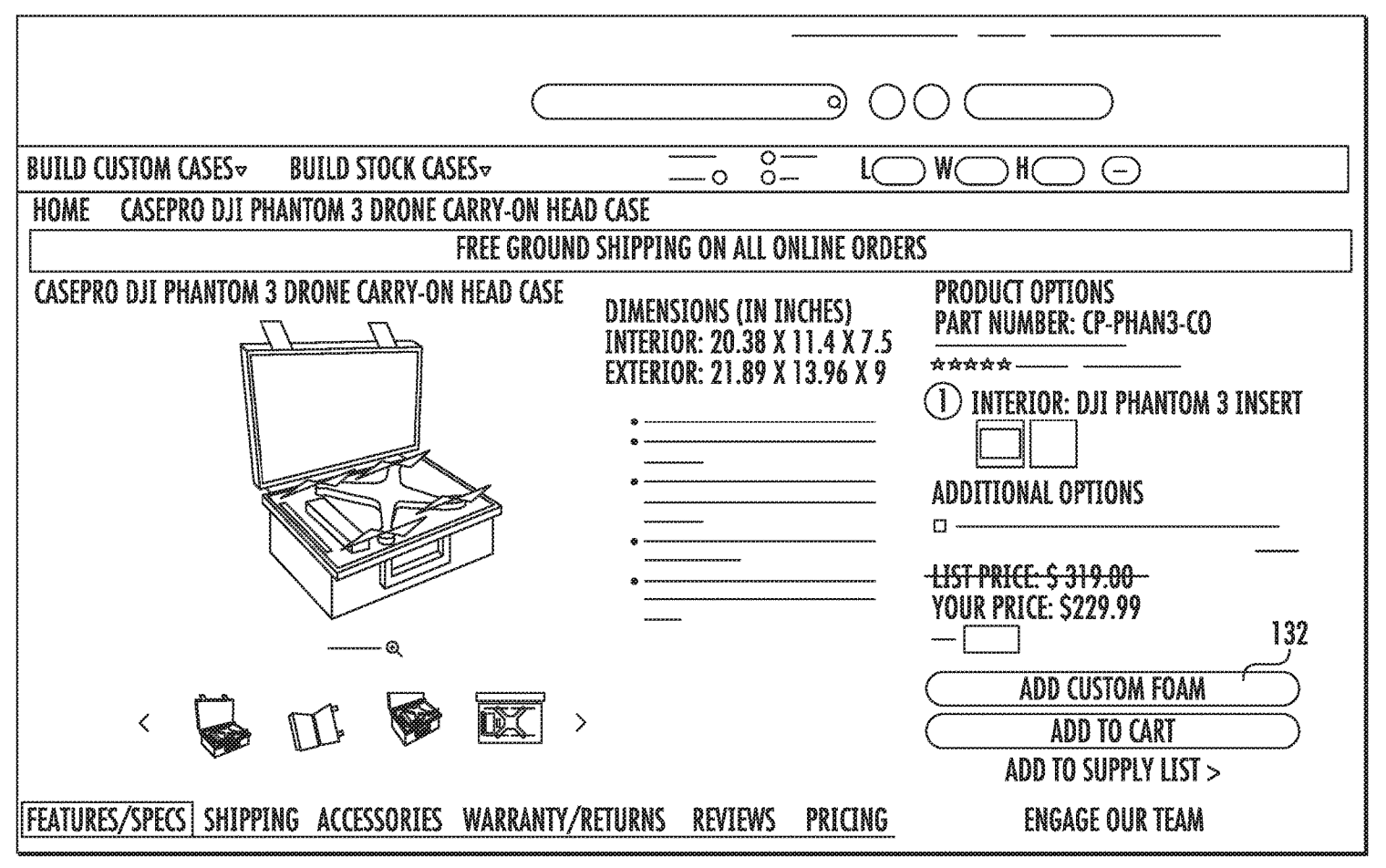

In one embodiment, a design of a custom foam can be used with a conventional container or package as shown in FIG. 16. A container or package is selected using container or package selection icon 130 at design tool graphical user interface 20. Add custom foam icon 132 can be activated as shown in FIG. 17 to modify the design of custom foam 134 displayed on display 24.

Figure 18:
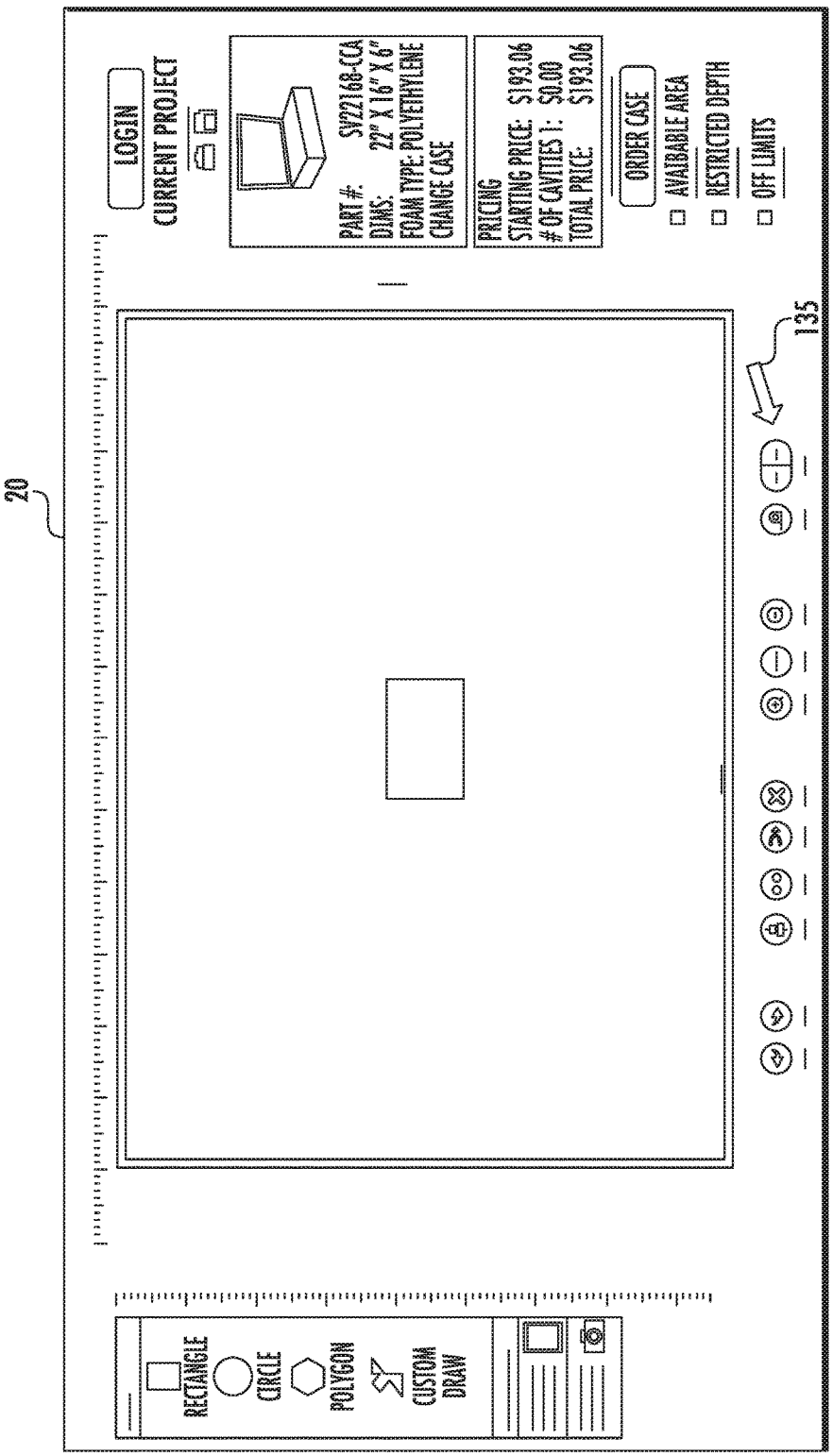
FIG. 18 is a schematic diagram of metric to imperial toggle icon used in the method for manufacturing a custom designed container or package and insert.

Referring to FIG. 18, design tool graphical user interface 20 can provide metric to imperial toggle icon 135. Activation of metric to imperial toggle icon 135 allows a user to switch between metric and imperial measurement standards in real time during the implementation of the method for custom designed container package and insert 10.

Figure 19:
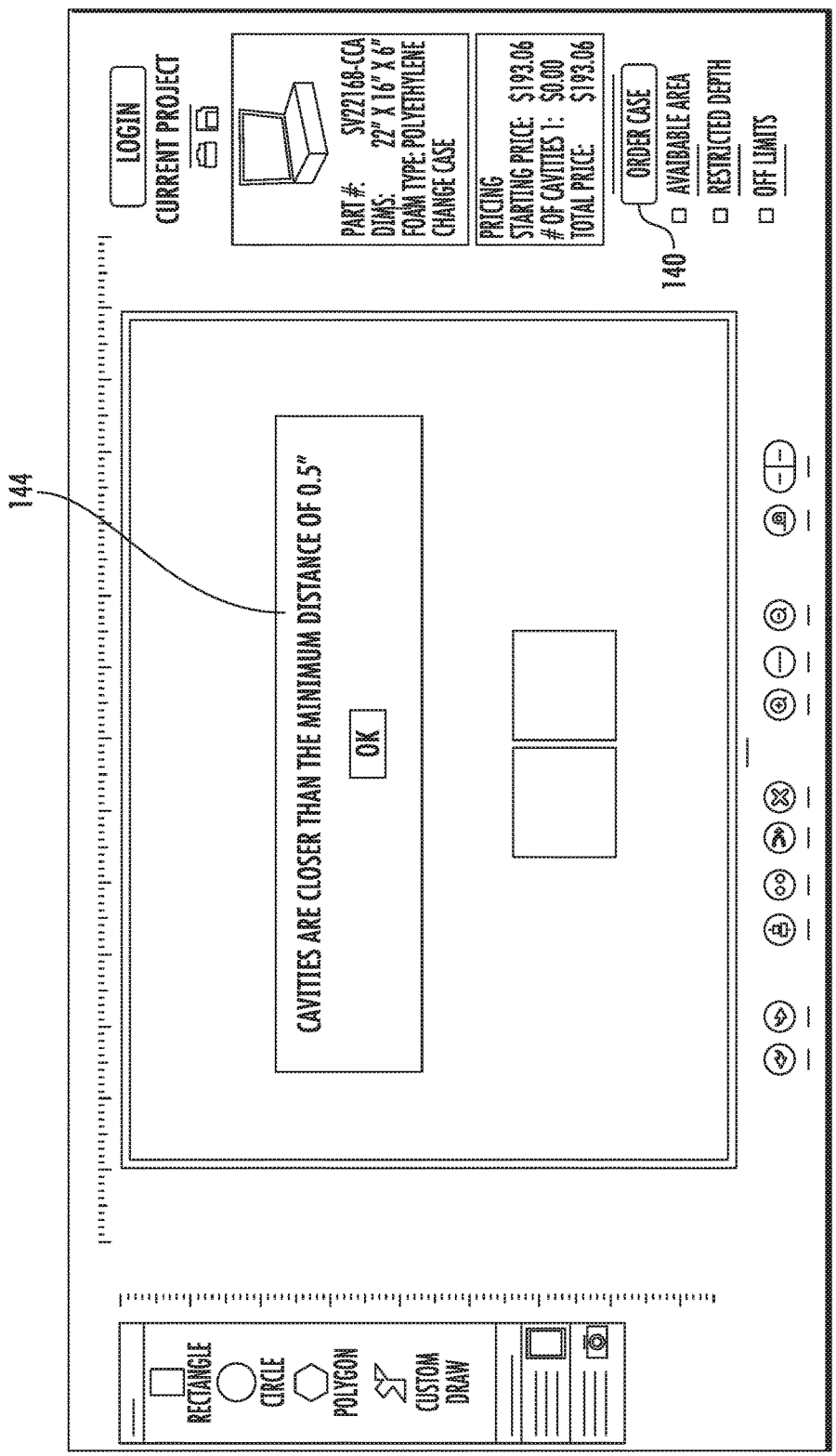
FIG. 19 is a schematic diagram of a validation rules icon used in the method for manufacturing a custom designed container or package and insert.

Photo trace design tool 70 of FIG. 9 can provide validation rules to provide parameters for manufacturing the custom designed container package and insert. Referring to FIG. 19, save or order case icon 140 can be activated for executing validation rules and sending a designed container package and insert to a shopping cart if the validation rules are met. Example validation rules include making sure a user does not create shapes deeper than foam, moving shapes in off limit areas 120 and border area 121 and moving shapes 63a-63n too close to each other. The rule of moving shapes 63a-63n too close to one another can be implemented by setting a minimum distance rule for spacing shapes. The minimum distance is dependent on the length of custom designed container or package and material of the insert. In one embodiment, if a user inputs shape dimension which does not fit within case dimensions the user will not be allowed to add or edit shape. When user clicks add cavity icon 143 as shown in Fig. and number is in violation, an error message will display telling user "Value must be less than _____" in template 144. For example, the validation rules can be is defined in a SVG file. When a user places shapes too close to each other and the user tries to Save/Order Case they will see an error message display. Design tool 30 can also add a colored border around shapes that are in violation as shown in FIG. 19.

Figure 21:
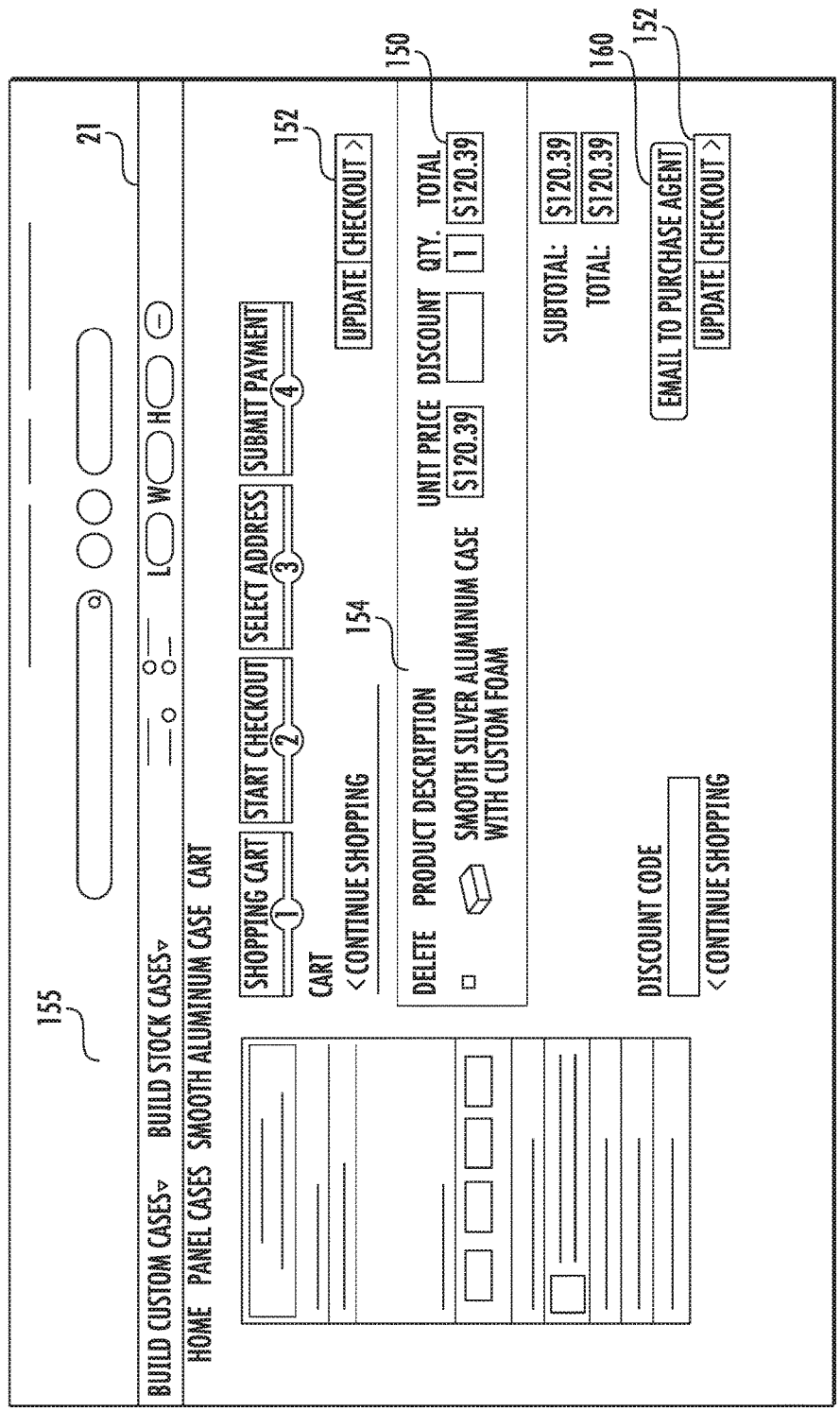
FIG. 21 is a schematic diagram of a purchase window used in the method for manufacturing a custom designed container or package and insert.

Referring to FIG. 21, design tool 30 can provide a dynamic pricing model. Pricing of container icon 150 can be displayed on design tool graphical user interface 20. Activating pricing of container icon 150 can display pricing template 151 on display 21. Pricing template 151 can display parameters for determining pricing.

Figure 22:
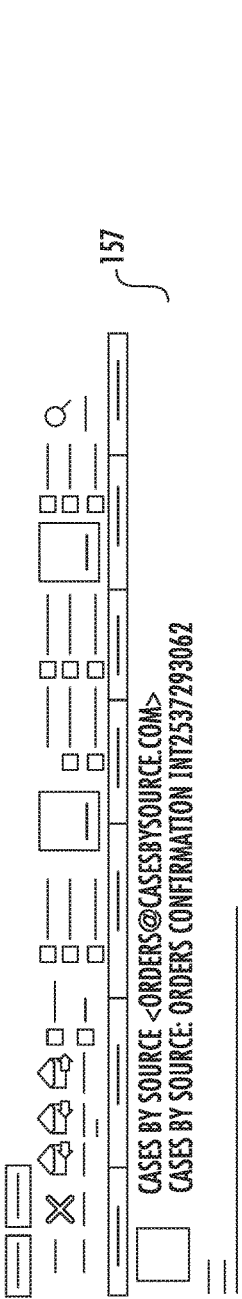
FIG. 22 is a schematic diagram of an user order confirmation email used in the method for manufacturing a custom designed container or package and insert.

A user can activate order case icon 152 and an order for a container or package and custom foam insert 154 is sent to shopping cart 155. A user receives order confirmation email 157 with attachment of the custom container and foam design 158 as shown in FIG. 22.

Figure 23:
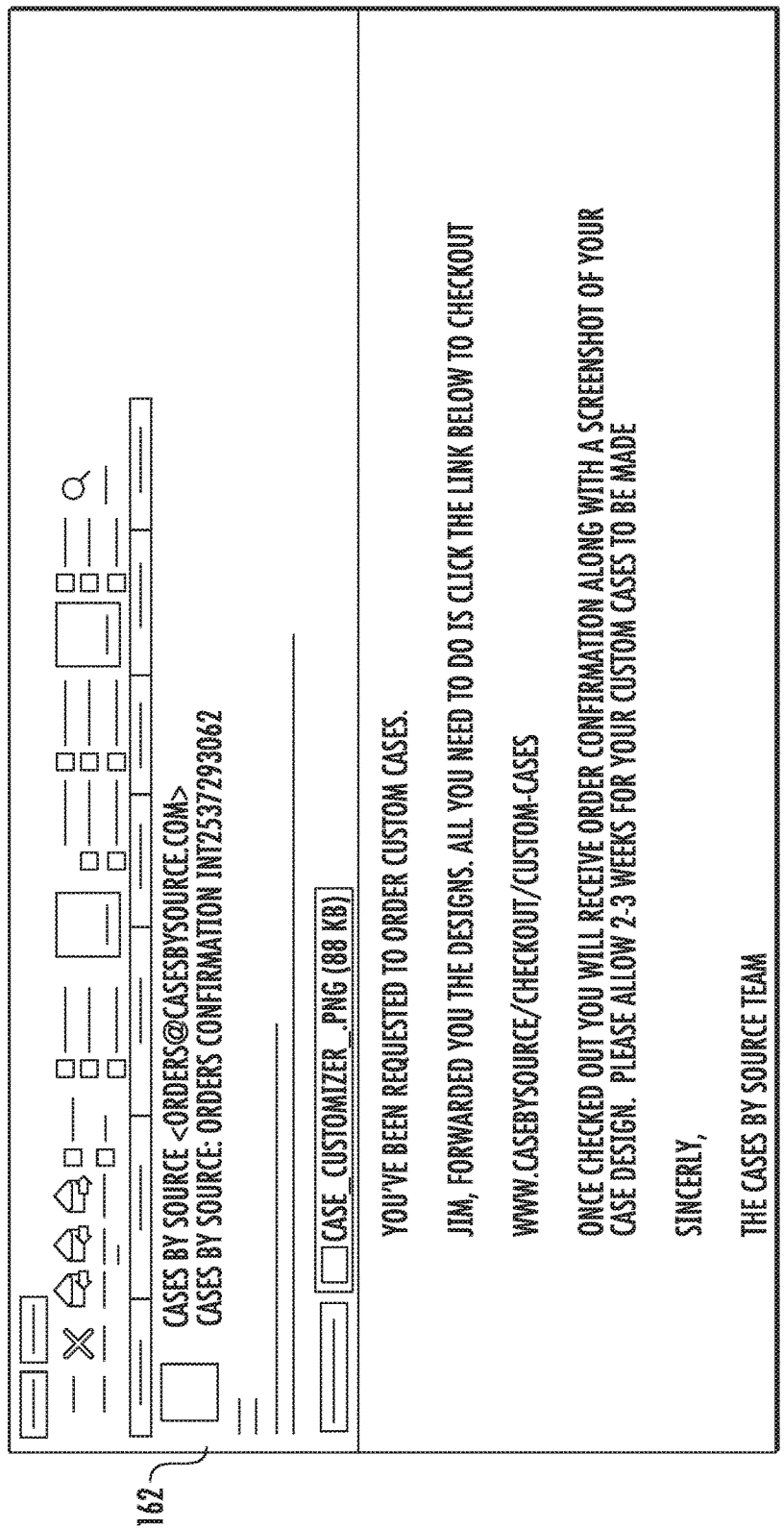
FIG. 23 is a schematic diagram of third party request for order confirmation email used in the method for manufacturing a custom designed container or package and insert.

Alternatively, forward design in shopping cart icon 160 as shown in FIG. 21 can be activated to forward order for container or package and custom foam 154 in shopping cart 155 to another entity. In one embodiment, container and custom foam design email 162 as shown in FIG. 23 is sent including order for container or package and custom foam design 154.

Figure 24:
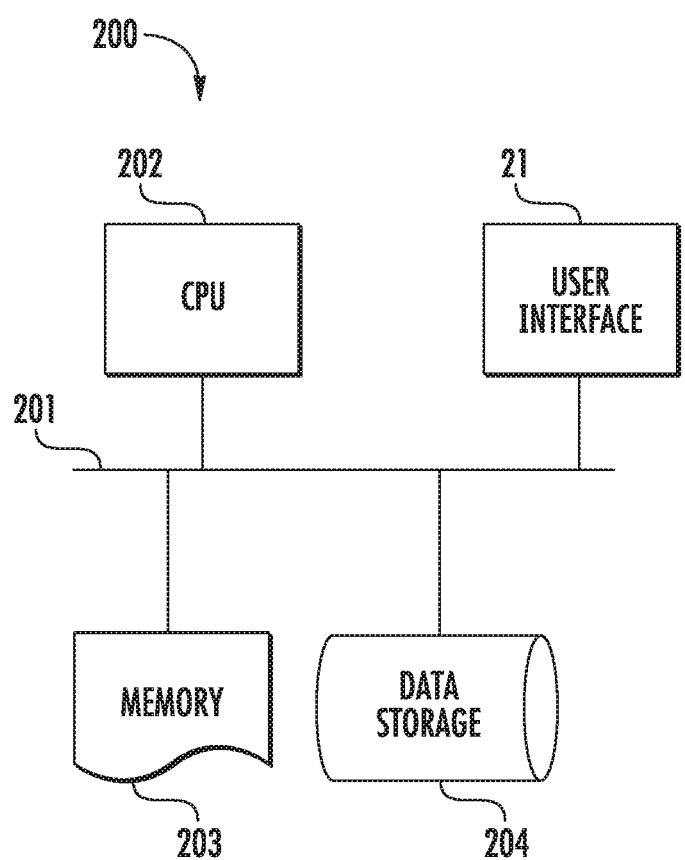
FIG. 24 is a schematic diagram of a system that can be used to implement various embodiments of the processes of the present invention.

FIG. 24 is a schematic diagram of hardware and/or electronics that can make up custom designed container package and insert system 200. One or more communications mediums 201 such as a bus or network interconnect the illustrated components and allow data and/or signals to flow between the components. CPU 202 is a processor that performs calculations and logic operations required to execute a program. Any number of processors may be available, and they may access a computer-readable memory device 203 containing programming instructions, along with a data storage facility 204 such as a database that stores generated images, templates and/or rule sets in a computer storage medium. Memory 203 and data storage may comprise electronic storage media that electronically stores information. The electronic storage media of electronic storage may include one or both of system storage that is provided integrally (i.e., substantially non-removable) with processor 202 and/or removable storage that is removably connectable to processor 202 via, for example, a port (e.g., a USB port, a firewire port, etc.) or a drive (e.g., a disk drive, etc.). Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage may include one or more virtual storage resources (e.g., cloud storage, a virtual private network, and/or other virtual storage resources). Electronic storage may store software algorithms, information determined by processor 202 information received at processor 204 and/or other information that enables processor 202 to function as described herein.

Processor(s) 202 may include one or more of a digital processor, an analog processor, a digital circuit designed to process information, an analog circuit designed to process information, a state machine, and/or other mechanisms for electronically processing information. Although processor 202 is shown in FIG. 24 as a single entity, this is for illustrative purposes only. In some implementations, processor 202 may include a plurality of processing units.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

In exemplary embodiments, the method 10 may be implemented in hardware, software, firmware, or any combination thereof in a form of a computer program product comprising one or more computer-executable instructions. When implemented in software, the computer program product may be stored on or transmitted using a computer-readable medium, which includes computer storage medium and computer communication medium. The term "computer storage medium" refers herein to any medium adapted for storing the instructions that cause the computer to execute the method. By way of example, and not limitation, the computer storage medium may comprise solid-sate memory devices, including electronic memory devices (e.g., RAM, ROM, EEPROM, and the like), optical memory devices (e.g., compact discs (CD), digital versatile discs (DVD), and the like), or magnetic memory devices (e.g., hard drives, flash drives, tape drives, and the like), or other memory devices adapted to store the computer program product, or a combination of such memory devices.

The term "computer communication medium" refers herein to any physical interface adapted to transmit the computer program product from one place to another using for example, a modulated carrier wave, an optical signal, a DC or AC current, and the like means. By way of example, and not limitation, the computer communication medium may comprise twisted wire pairs, printed or flat cables, coaxial cables, fiber-optic cables, digital subscriber lines (DSL), or other wired, wireless, or optical serial or parallel interfaces, or a combination thereof.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A computer implemented method for designing packaging for one or more objects comprising the steps of:
    selecting a size of a container or package using a size graphical user interface displayed on a display device by a design tool graphical user interface, wherein the step of selecting the size of the container or package comprises the steps of:
        causing a size icon to be presented to a user;
        activating the size icon to display the size graphical user interface on the display device;
        providing a template at the size graphical user interface to instruct the user to place objects to be packaged on a flat surface in a layout;
        providing one or more graphical common objects on the display device; and
        selecting one of the graphical common objects to best match the layout; and
    designing a custom foam insert using an insert shape graphical user interface displayed on the display device, said custom foam insert including one or more cavities corresponding to respective one or more features of said one or more objects;
    wherein said custom foam insert can be received in said container or package and said custom foam insert is adapted to receive said one or more objects.

2. The method of claim 1 wherein the step of selecting the size of the container or package comprises the steps of:
    causing a find me a container icon to be presented to the user;
    activating the find me a container icon to display on the size graphical user interface one or more containers or packages having a predetermined size in relation to graphical common objects shown on the display device.

3. The method of claim 1 wherein the step of selecting the size of the container or package comprises the steps of;
    instructing the user to enter one or more dimensions; and
    selecting the entered dimension; and determining the size of the container or package from the selected dimensions.

4. The method of claim 1 wherein the step of designing the foam insert further comprises the steps of:
    causing a foam type icon to be presented to the user;
    activating the foam type icon to launch a pop-up foam type window displaying a plurality of foam types which can be selected by the user; and
    selecting one of the displayed foam types.

5. The method of claim 1 wherein the size graphical interface displays a starting canvas on the display device and further comprising the steps of:
    causing a zoom icon to be displayed on the graphical user interface on the display device; and
    activating the zoom icon to size the starting canvas to a pre-determined value.

6. The method of claim 1 wherein the step of designing the custom foam insert comprises the steps of:
    causing an add custom foam icon to be displayed on the display device; and
    activating the add custom foam icon to modify a design of custom foam which is displayed on the display device.

7. The method of claim 1 further comprising the steps of:
    causing a metric to imperial toggle icon to be displayed on the display device; and
    activating the metric to imperial toggle icon to switch between metric and imperial measurement standards in real time used in determining the size of the container or package.

8. The method of claim 1 wherein the step of designing the custom foam insert includes providing validation rules to provide parameters for manufacturing the custom foam insert.

9. The method of claim 1 further comprising the steps of:
    causing a pricing of a container icon to be displayed on the design tool graphical interface at the display device; and
    activating the pricing of a container icon display parameters for determining pricing of the packaging.

10. The method of claim 1 further comprising the steps of:
causing an order case icon to be displayed on the design tool graphical interface at the display device; and
activating the order case icon display parameters for sending an order for the package and custom foam insert design to a shopping cart, the shopping cart being implemented in a processor.

11. The method of claim 1 wherein information displayed at the design tool graphical user interface, the size graphical user interface and the insert shape graphical user interface are provided to the user through a web based service.

12. A computer implemented method for designing packaging for one or more objects comprising the steps of:
selecting a size of a container or package using a size graphical user interface displayed on a display device by a design tool graphical user interface; and
designing a custom foam insert using an insert shape graphical user interface displayed on the display device, said custom foam insert including one or more cavities corresponding to respective one or more features of said one or more objects, wherein the step of designing the custom foam insert further comprises the steps of:
causing one or more shapes to be displayed on the display device;
selecting one or more of the displayed shapes; and
spacing the one or more selected shapes on the display device;
wherein the user places a first one of the selected shapes at a position of a right most point of a starting canvas and the user places a second one of the selected shapes a position of a left most point of the starting canvas; and further comprising the step of:
automatically spacing evenly the remaining one or more of the selected shapes between the first one of the selected shapes and the second one of the selected shapes on the display device;
wherein said custom foam insert can be received in said container or package and said custom foam insert is adapted to receive said one or more objects.

13. The method of claim 12 wherein the one or more selected shapes are displayed in a starting canvas at the display device and further comprising the step of:
automatically moving the one or more shapes moved into an off limits area back into the starting canvas.

14. A computer implemented method for designing packaging for one or more objects comprising the steps of:
selecting a size of a container or package using a size graphical user interface displayed on a display device by a design tool graphical user interface; and
designing a custom foam insert using an insert shape graphical user interface displayed on the display device, said custom foam insert including one or more cavities corresponding to respective one or more features of said one or more objects, wherein the step of designing includes creating and saving an insert representation of the custom foam insert further comprising the steps of:
uploading a photograph of the one or more objects using the insert shape graphical user interface displayed on the display device;
creating a trace representation of the uploaded photograph on the display device; and
saving the trace representation as the insert representation to a memory as the data file in a user's library;
wherein the uploaded photograph is a bitmap and the step of creating a trace representation converts the bitmap to vector graphics;
wherein said custom foam insert can be received in said container or package and said custom foam insert is adapted to receive said one or more objects.

15. The method of claim 14 further comprising the step of:
causing one or more of undo icon, redo icon, add point icon, delete point icon and clear path icon to be displayed on the display device, wherein said undo icon can be activated to delete the trace representation, the add point icon can be activated to add one or more points to the trace representation, the delete point icon can be activated to delete one or more points from the trace representation and the clear path icon can be activated to clear a path of one or more points from the trace representation.

16. The method of claim 14 wherein the trace representation is cropped in a boundary.

17. The method of claim 14 wherein the step of designing the custom foam insert includes the steps of:
causing an add shape icon to be displayed on the displayed device; and
activating the add shape icon to retrieve the trace representation saved in the user's library.

18. The method of claim 14 wherein the step of displaying the design tool graphical user interface and the step of creating a trace representation of the uploaded photograph are performed with SVG-edit.

19. The method of claim 14 wherein the step of creating the trace representation of the uploaded photograph further comprises the steps of:
causing an input object depth template and an input object length template to be displayed on the display device;
entering a depth of the one or more objects in the input depth template and a length of the one or more objects in the input object length template; and
scaling the trace representation with the depth and the length.

* * * * *